US011216531B2

(12) United States Patent
Clarke et al.

(10) Patent No.: US 11,216,531 B2
(45) Date of Patent: Jan. 4, 2022

(54) ENTERPRISE SOFTWARE ADOPTION PLATFORM SYSTEMS AND METHODS

(71) Applicant: PricewaterhouseCoopers LLP, New York, NY (US)

(72) Inventors: David Clarke, Aventura, FL (US); Thomas Joseph Puthiyamadam, New York, NY (US); Warren Barton, Parkland, FL (US); William A. Fiorentino, Wilton Manors, FL (US); Carlos Rodriguez, Miami, FL (US); Jonpol Lavalle, Miami, FL (US); Brian Jones, North Bay Village, FL (US); Federico Loguzzo, Miami, FL (US); Richard Longman, Boca Raton, FL (US); Cydney Aiken, Houston, TX (US); Bob Gruman, Houston, TX (US); Pradeep Giri, Cleveland, OH (US); Kryssie Knowles, Hallandale Beach, FL (US)

(73) Assignee: PricewaterhouseCoopers LLP, New York, NY (US)

( * ) Notice: Subject to any disclaimer, the term of this patent is extended or adjusted under 35 U.S.C. 154(b) by 0 days.

(21) Appl. No.: 16/994,053

(22) Filed: Aug. 14, 2020

(65) Prior Publication Data

US 2021/0049227 A1    Feb. 18, 2021

Related U.S. Application Data

(60) Provisional application No. 62/976,230, filed on Feb. 13, 2020, provisional application No. 62/887,425, filed on Aug. 15, 2019.

(51) Int. Cl.
*G06F 17/10* (2006.01)
*G06F 16/958* (2019.01)
(Continued)

(52) U.S. Cl.
CPC .......... *G06F 16/986* (2019.01); *G06F 3/0486* (2013.01); *G06F 11/3438* (2013.01); *G06F 16/9574* (2019.01)

(58) Field of Classification Search
CPC .. G06F 16/986; G06F 16/9574; G06F 3/0486; G06F 11/3438
See application file for complete search history.

(56) References Cited

U.S. PATENT DOCUMENTS 6,587,668 B1 * 7/2003 Miller ...................... G09B 5/00
434/350
7,822,631 B1 * 10/2010 Vander Mey ...... G06Q 30/0201
705/7.29
(Continued)

OTHER PUBLICATIONS

Anonymous. (Jul. 14, 2019) "What are extensions?," located at web.archive.org/web/20190714175721/https://developer.mozilla.org/en-US/docs/Mozilla/Add-ons/WebExtensions/What_are_WebExtensions, visited on Nov. 9, 2020; 7 pages.
(Continued)

*Primary Examiner* — Shahid K Khan
(74) *Attorney, Agent, or Firm* — Morrison & Foerster LLP

(57) ABSTRACT

This invention relates to software adoption platform systems and methods. An exemplary computer-implemented method comprises at an electronic device with a display, displaying a window associated with a software system; displaying, within the window, a user interface corresponding to a software adoption platform, wherein the user interface corresponding to the software adoption platform comprises: a user-specific score associated with the software system, and a plurality of user affordances corresponding to a plurality of actions within the software system; upon selection of a user affordance of the plurality of user affordances, automatically displaying a page of the software system in the window
(Continued)

based on the selected user affordance, and automatically displaying one or more messages overlaid over the page of the software system, wherein the one or more messages are generated by the software adoption platform.

**15 Claims, 24 Drawing Sheets
(16 of 24 Drawing Sheet(s) Filed in Color)**

(51) Int. Cl.
*G06F 16/957* (2019.01)
*G06F 3/0486* (2013.01)
*G06F 11/34* (2006.01)

(56) References Cited

U.S. PATENT DOCUMENTS

| | | | | |
|---|---|---|---|---|
| 9,792,583 | B2* | 10/2017 | Perreault | G06Q 20/102 |
| 10,032,385 | B2* | 7/2018 | DeFreitas | G09B 5/00 |
| 11,074,058 | B1* | 7/2021 | Mowatt | G06F 8/71 |
| 2002/0113813 | A1* | 8/2002 | Yoshimine | G11B 27/034 |
| | | | | 715/723 |
| 2004/0113949 | A1* | 6/2004 | Cooper | G06F 21/31 |
| | | | | 715/779 |
| 2007/0203711 | A1* | 8/2007 | Nation | G09B 5/00 |
| | | | | 434/350 |
| 2008/0162274 | A1* | 7/2008 | Newman | G09B 7/00 |
| | | | | 434/219 |
| 2010/0331064 | A1 | 12/2010 | Michelstein et al. | |
| 2014/0032691 | A1* | 1/2014 | Barton | H04L 41/00 |
| | | | | 709/206 |
| 2014/0127667 | A1* | 5/2014 | Iannacone | G09B 5/02 |
| | | | | 434/379 |
| 2014/0129457 | A1* | 5/2014 | Peeler | G06Q 10/067 |
| | | | | 705/317 |
| 2017/0010775 | A1* | 1/2017 | Grover | G06F 11/3438 |
| 2017/0018023 | A1* | 1/2017 | Roux | G06Q 30/0641 |
| 2019/0073365 | A1* | 3/2019 | Jamshidi | G06F 16/958 |

OTHER PUBLICATIONS

International Search Report and Written Opinion dated Feb. 1, 2021, directed to International Application No. PCT/US2020/046442; 21 pages.

* cited by examiner

FIG. 6C

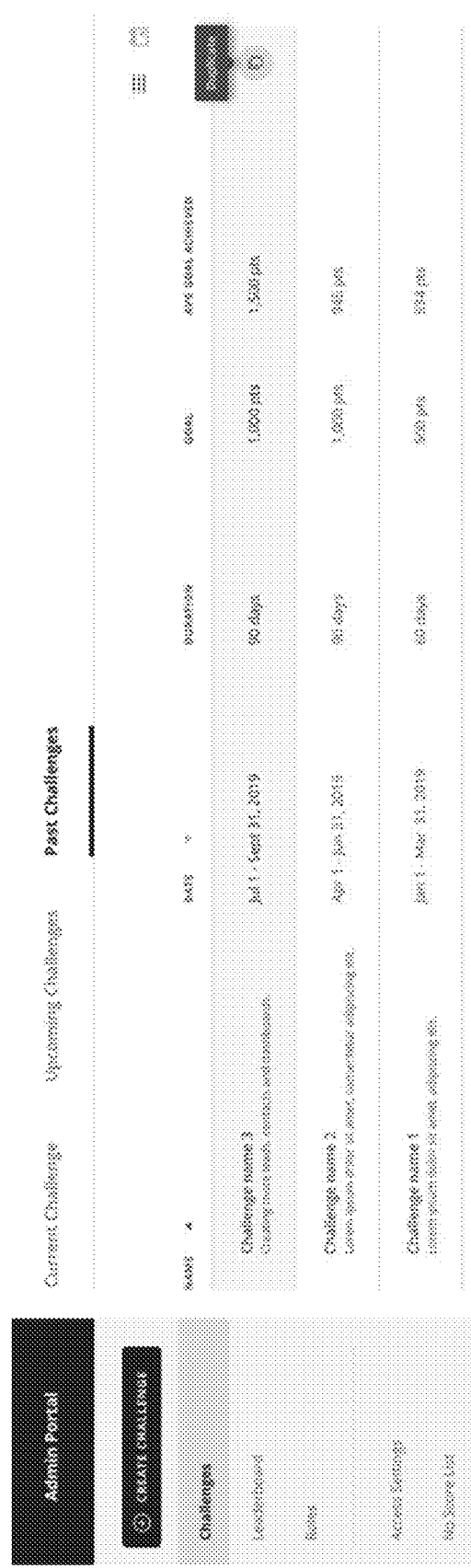
FIG. 6D
FIG. 6E

902
DISPLAYING A WINDOW ASSOCIATED WITH A SOFTWARE SYSTEM

904
DISPLAYING, WITHIN THE WINDOW, A USER INTERFACE CORRESPONDING TO A SOFTWARE ADOPTION PLATFORM,

WHEREIN THE USER INTERFACE CORRESPONDING TO THE SOFTWARE ADOPTION PLATFORM COMPRISES: A USER-SPECIFIC SCORE ASSOCIATED WITH THE SOFTWARE SYSTEM, AND A PLURALITY OF USER AFFORDANCES CORRESPONDING TO A PLURALITY OF ACTIONS WITHIN THE SOFTWARE SYSTEM

906
UPON SELECTION OF A USER AFFORDANCE OF THE PLURALITY OF USER AFFORDANCES, AUTOMATICALLY DISPLAYING A PAGE OF THE SOFTWARE SYSTEM IN THE WINDOW BASED ON THE SELECTED USER AFFORDANCE, AND

908
AUTOMATICALLY DISPLAYING ONE OR MORE MESSAGES OVERLAID OVER THE PAGE OF THE SOFTWARE SYSTEM, WHEREIN THE ONE OR MORE MESSAGES ARE GENERATED BY THE SOFTWARE ADOPTION PLATFORM

FIG. 9

ENTERPRISE SOFTWARE ADOPTION PLATFORM SYSTEMS AND METHODS

REFERENCE TO RELATED APPLICATIONS

This application claims the benefit of U.S. Provisional Patent Application No. 62/887,425, filed Aug. 15, 2019, and U.S. Provisional Patent Application No. 62/976,230, filed Feb. 13, 2020, the entire contents of each of which are incorporated herein by reference.

FIELD OF THE INVENTION

This invention relates to adoption platform systems and methods, including a software adoption platform providing a set of consistent user interfaces ("UI"), gamification features, and point-of-need functionalities for automatically driving adoption of new technologies (e.g., various enterprise software) within an organization.

BRIEF SUMMARY

A computer-implemented method comprises at an electronic device with a display, displaying a window associated with a software system; displaying, within the window, a user interface corresponding to a software adoption platform, wherein the user interface corresponding to the software adoption platform comprises: a user-specific score associated with the software system, and a plurality of user affordances corresponding to a plurality of actions within the software system; upon selection of a user affordance of the plurality of user affordances, automatically displaying a page of the software system in the window based on the selected user affordance, and automatically displaying one or more messages overlaid over the page of the software system, wherein the one or more messages are generated by the software adoption platform.

In some embodiments, the window is a window of a web browser or a tab of the web browser.

In some embodiments, the method further comprises receiving one or more user inputs corresponding to completion of an action of the plurality of actions; and updating the user-specific score based on one or more inputs and a role associated with the user.

In some embodiments, the user interface corresponding to the software adoption platform further comprises a ranking of users of the software system.

In some embodiments, the user-specific score is associated with a time period.

A computer-implemented method comprises at an electronic device with a display, displaying a first window associated with a first software system, wherein the first window comprises a first user affordance corresponding to a software adoption platform, upon selection of the first user affordance, displaying: a first user-specific score associated with the first software system, and a first plurality of actions associated with the first software system; displaying a second window associated with a second software system, wherein the second window comprises a second user affordance corresponding to the software adoption platform, upon selection of the second user affordance, displaying: a second user-specific score associated with the second software system, and a second plurality of actions associated with the second software system.

In some embodiments, the window is a window of a web browser or a tab of the web browser.

In some embodiments, the first user affordance is a widget embedded in the web browser.

In some embodiments, the first user affordance comprises the first user-specific score.

In some embodiments, the method further comprises upon selection of an action of the first plurality of actions, automatically displaying a page of the first software system in the first window; and automatically displaying one or more messages overlaid over the page of the first software system, wherein the one or more messages are generated by the software adoption platform.

An computer-implemented method comprises: receiving a user selection of a predefined objective associated with a software system, wherein the predefined objective is pre-associated with a plurality of actions within the software system; displaying a plurality of areas corresponding to a plurality of predefined responsibility types; displaying a plurality of predefined roles within an organization; receiving one or more drag-and-drop inputs assigning the plurality of roles to the plurality responsibility types; based on the one or more drag-and-drop inputs and the selected objective, automatically generating a set of scoring rules, wherein the set of scoring rules specifies an amount of points to each role of the plurality of roles for completing each action of the plurality of actions.

In some embodiments, the set of scoring rules is associated with a challenge.

An computer-implemented method for tracking a user's adoption of a software system comprises receiving, from the software system, data related to an action taken by the user within the software system; based on the software system and the user, obtaining a rule associated with a software adoption platform; calculating a user-specific score based on the rule and the user action; updating a user affordance embedded in a user interface of the software system based on the calculated score.

In some embodiments, the method further comprises displaying a user interface associated with the software adoption platform, wherein the user interface associated with the software adoption platform comprises an action, wherein the action is associated with the software system; receiving a user selection of the action; in response to receiving the user selection of the action, displaying a user interface of the software system; receiving an input within the user interface of the software system, wherein the input is part of the data related to an action taken by the user within the software system.

A non-transitory computer-readable storage medium stores one or more programs, the one or more programs comprising instructions, which when executed by one or more processors of an electronic device having a display, cause the electronic device to: display a window associated with a software system; display, within the window, a user interface corresponding to a software adoption platform, wherein the user interface corresponding to the software adoption platform comprises: a user-specific score associated with the software system, and a plurality of user affordances corresponding to a plurality of actions within the software system; upon selection of a user affordance of the plurality of user affordances, automatically display a page of the software system in the window based on the selected user affordance, and automatically display one or more messages overlaid over the page of the software system, wherein the one or more messages are generated by the software adoption platform.

A non-transitory computer-readable storage medium stores one or more programs, the one or more programs comprising instructions, which when executed by one or more processors of an electronic device having a display, cause the electronic device to: display a first window associated with a first software system, wherein the first window comprises a first user affordance corresponding to a software adoption platform, upon selection of the first user affordance, display: a first user-specific score associated with the first software system, and a first plurality of actions associated with the first software system; display a second window associated with a second software system, wherein the second window comprises a second user affordance corresponding to the software adoption platform, upon selection of the second user affordance, display: a second user-specific score associated with the second software system, and a second plurality of actions associated with the second software system.

A non-transitory computer-readable storage medium stores one or more programs, the one or more programs comprising instructions, which when executed by one or more processors of an electronic device having a display, cause the electronic device to: receiving a user selection of a predefined objective associated with a software system, wherein the predefined objective is pre-associated with a plurality of actions within the software system; display a plurality of areas corresponding to a plurality of predefined responsibility types; display a plurality of predefined roles within an organization; receive one or more drag-and-drop inputs assigning the plurality of roles to the plurality responsibility types; based on the one or more drag-and-drop inputs and the selected objective, automatically generate a set of scoring rules, wherein the set of scoring rules specifies an amount of points to each role of the plurality of roles for completing each action of the plurality of actions.

A non-transitory computer-readable storage medium stores one or more programs, the one or more programs comprising instructions, which when executed by one or more processors of an electronic device having a display, cause the electronic device to: receive, from the software system, data related to an action taken by the user within the software system; based on the software system and the user, obtain a rule associated with a software adoption platform; calculate a user-specific score based on the rule and the user action; update a user affordance embedded in a user interface of the software system based on the calculated score.

An electronic device, comprises: a display; one or more processors; a memory; and one or more programs, wherein the one or more programs are stored in the memory and configured to be executed by the one or more processors, the one or more programs including instructions for: displaying a window associated with a software system; displaying, within the window, a user interface corresponding to a software adoption platform, wherein the user interface corresponding to the software adoption platform comprises: a user-specific score associated with the software system, and a plurality of user affordances corresponding to a plurality of actions within the software system; upon selection of a user affordance of the plurality of user affordances, automatically displaying a page of the software system in the window based on the selected user affordance, and automatically displaying one or more messages overlaid over the page of the software system, wherein the one or more messages are generated by the software adoption platform.

An electronic device, comprises: a display; one or more processors; a memory; and one or more programs, wherein the one or more programs are stored in the memory and configured to be executed by the one or more processors, the one or more programs including instructions for: displaying a first window associated with a first software system, wherein the first window comprises a first user affordance corresponding to a software adoption platform, upon selection of the first user affordance, displaying: a first user-specific score associated with the first software system, and a first plurality of actions associated with the first software system; displaying a second window associated with a second software system, wherein the second window comprises a second user affordance corresponding to the software adoption platform, upon selection of the second user affordance, displaying: a second user-specific score associated with the second software system, and a second plurality of actions associated with the second software system.

An electronic device, comprises: a display; one or more processors; a memory; and one or more programs, wherein the one or more programs are stored in the memory and configured to be executed by the one or more processors, the one or more programs including instructions for receiving a user selection of a predefined objective associated with a software system, wherein the predefined objective is pre-associated with a plurality of actions within the software system; displaying a plurality of areas corresponding to a plurality of predefined responsibility types; displaying a plurality of predefined roles within an organization; receiving one or more drag-and-drop inputs assigning the plurality of roles to the plurality responsibility types; based on the one or more drag-and-drop inputs and the selected objective, automatically generating a set of scoring rules, wherein the set of scoring rules specifies an amount of points to each role of the plurality of roles for completing each action of the plurality of actions.

An electronic device, comprises: a display; one or more processors; a memory; and one or more programs, wherein the one or more programs are stored in the memory and configured to be executed by the one or more processors, the one or more programs including instructions for: receiving, from the software system, data related to an action taken by the user within the software system; based on the software system and the user, obtaining a rule associated with a software adoption platform; calculating a user-specific score based on the rule and the user action; updating a user affordance embedded in a user interface of the software system based on the calculated score.

BRIEF DESCRIPTION OF THE DRAWINGS

The patent or application file contains at least one drawing executed in color. Copies of this patent or patent application publication with color drawings will be provided by the office upon request and payment of the necessary fee.

FIG. 6C illustrates an exemplary user interface for an administrative home portal, according to some embodiments.

FIG. 6D illustrates an exemplary user interface for an administrative home portal, according to some embodiments.

FIG. 6E illustrates an exemplary user interface for an administrative home portal, according to some embodiments.

FIG. 7B depicts an exemplary user interface for a point-of-need learning walk-through, according to some embodiments.

FIG. 9 illustrates a block diagram of an exemplary process for providing a software adoption platform, according to some embodiments.

DETAILED DESCRIPTION OF THE INVENTION

Figure 1A:
FIG. 1A illustrates an exemplary user interface for providing an entry point to the software adoption platform, according to some embodiments.

Described are adoption platform systems and methods. The adoption platform systems encourage the use of enterprise software systems used by an organization. The adoption platform can interface directly with enterprise software systems and/or is embedded within the enterprise software systems to track usage of the systems and encourage use of the systems by employees of the organization. The adoption platform can constantly train and engage the employees in an automated manner. The adoption platform can reduce training costs and reduce the amount of personal IT help related to using enterprise software systems. The cost reduction is also due to increased utilization of expensive enterprise software systems.

In some embodiments, the adoption platform provides a set of consistent UIs and user experiences for automatically driving adoption of various enterprise software within an organization. In some embodiments, the software adoption platform includes customizable gamification features (e.g., a points system, a leaderboard, challenge cycles) that allow an organization to incentivize intended behaviors. In some embodiments, the software adoption platform includes personalized point-of-need learning functionalities (e.g., automatic walk-through of an action within the enterprise software) to allow employees to learn while doing, thus increasing knowledge retention. In some embodiments, the software adoption platform provides data visualization tools and analytics tools to allow an organization to visualize the adoption process.

In some embodiments, the adoption platform includes an employee dashboard user interface. The user interface can include actions that a user can perform in the enterprise software system. By performing these actions, the user is automatically given points in the platform. These points allow the organization to keep track of user involvement in the enterprise software system. In addition these points help gamify use of the enterprise software system by allowing employees to compare their point total to other employee point totals in real-time. By gamifying use of the enterprise software system, the platform encourages employees use of the enterprise software by allowing employees to compete against one another in real-time. Further, the system allows users to learn while actually using the enterprise software. By learning by doing, the system increases employee knowledge retention.

In some embodiments, the platform includes a customizable points system based up on specific employee roles within the software and the desired behaviors as motivated by the origination's strategic business goals. Employees can compete for points during "challenge cycles" or "challenge periods." The challenge cycles can be game cycles with a duration determined by administrators in the organization.

In some embodiments, the system includes an administrative portal user interface (as referred to as "Behavior Activator") that allows for the customization of the points system and the games cycles. The administrative portal can also include an analytics engine that allows administrators to view current adoption performance metrics. These analytics can also be used by the administrators or by the platform itself to optimize the points system and actions for future challenge cycles.

In some embodiments, the adoption platform includes an automatic setting feature. The automatic setting feature automatically determines or suggests settings for a challenge period. The automatic setting feature may base the settings, for example, on one or more of analytics from the platform, the organization's industry, seasonality, and competitor and historical company data. The automatic setting feature can change the settings over time as more information is gained on the platform.

In some embodiments, the adoption platform is able to interface with a variety of different enterprise software systems. Enterprise software systems that the adoption platform may interface with include, for example, Salesforce, Oracle, and SAP enterprise software. By being able to interface with a variety of different enterprise systems, the platform allows for the same adoption platform to be used each time that a new enterprise system is added to an organization. The adoption platform can thus provide consistent UIs and mechanisms (e.g., gamification features, analytics, learning functionalities) across different enterprise software systems. This allows employees to become comfortable with the adoption platform and with the adoption of new enterprise software systems. Further, the organization no longer needs to invest significant money, time, and resources to build a separate set of training and adoption mechanisms each time it introduces a new technology.

In some embodiments, the adoption platform is injected into the enterprise software via a browser widget within a user's browser and an extension, such as a java script extension, that is embedded into each enterprise software package. This allows the adoption platform to show up alongside the enterprise software in a browser in a seamless manner. The browser widget may be the same for all enterprise software packages using the adoption platform, but the extension embedded into the enterprise software package may be customized according to the enterprise software package.

The following description sets forth exemplary methods, parameters, and the like. It should be recognized, however, that such description is not intended as a limitation on the scope of the present disclosure but is instead provided as a description of exemplary embodiments.

Although the following description uses terms "first," "second," etc. to describe various elements, these elements should not be limited by the terms. These terms are only used to distinguish one element from another. For example, a first graphical representation could be termed a second graphical representation, and, similarly, a second graphical representation could be termed a first graphical representation, without departing from the scope of the various described embodiments. The first graphical representation and the second graphical representation are both graphical representations, but they are not the same graphical representation.

The terminology used in the description of the various described embodiments herein is for the purpose of describing particular embodiments only and is not intended to be limiting. As used in the description of the various described embodiments and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

The term "if" is, optionally, construed to mean "when" or "upon" or "in response to determining" or "in response to detecting," depending on the context. Similarly, the phrase "if it is determined" or "if [a stated condition or event] is detected" is, optionally, construed to mean "upon determining" or "in response to determining" or "upon detecting [the stated condition or event]" or "in response to detecting [the stated condition or event]," depending on the context.

FIG. 1A illustrates an exemplary user interface for providing an entry point to the software adoption platform, in accordance with some embodiments. As depicted, a widget UI affordance 102 is embedded in a page of an enterprise software system 105 (i.e., Salesforce Sales Cloud) in a window or tab of a web browser. In some embodiments, the widget UI affordance 102 can be injected via a browser extension or via a code snippet in the main header of the enterprise application system. In the depicted example, the widget UI affordance includes a display of a user's current score associated with the enterprise software, which is described further below. In some embodiments, the widget UI affordance 102 is embedded on every page of the enterprise software, acting as a constant motivator for employees without being invasive.

If the organization has multiple enterprise software systems for which the adoption system is enabled, the widget UI affordance will display different values in different enterprise software systems based on the challenge rules, points, and goals of the corresponding enterprise software systems.

Figure 1B:
FIG. 1B illustrates an exemplary user interface for an employee home dashboard, according to some embodiments.

FIG. 1B illustrates a user interface for an employee home dashboard, according to some embodiments. The Dashboard includes a score dial section 112 showing the employee's current point total in real-time. The leaderboard section 114 also shows the point total for other employees in the organization and indicates how the employee stacks up against their peers in real-time. The Dashboard also includes an action section 116 that provides links to actions that an employee make click on to gain additional points. The links connect directly to the enterprise software, which allows the employee to perform the action or task indicated in the link and gain points. By encouraging employees to perform these actions, the organization can encourage specific actions that matches the desired business goals of the organization.

The adoption platform allows for more than just encouraging learning of a new enterprise software program, it allows for the organization to encourage employees to perform desired actions. For example, an organization may want to have a Salesforce team focus on driving a new type of revenue stream, which they haven't ventured in before. The organization can use the adoption platform to encourage actions by employees across the organization to make sure that everyone is aligned with this business goal. Using Salesforce, for example, the adoption platform can encourage sales employees to create new leads within this new sector. On the financial side, the adoption platform may incentivize more creative ways for pricing, to allow the sales team to have more competitive deals.

Figure 7A:
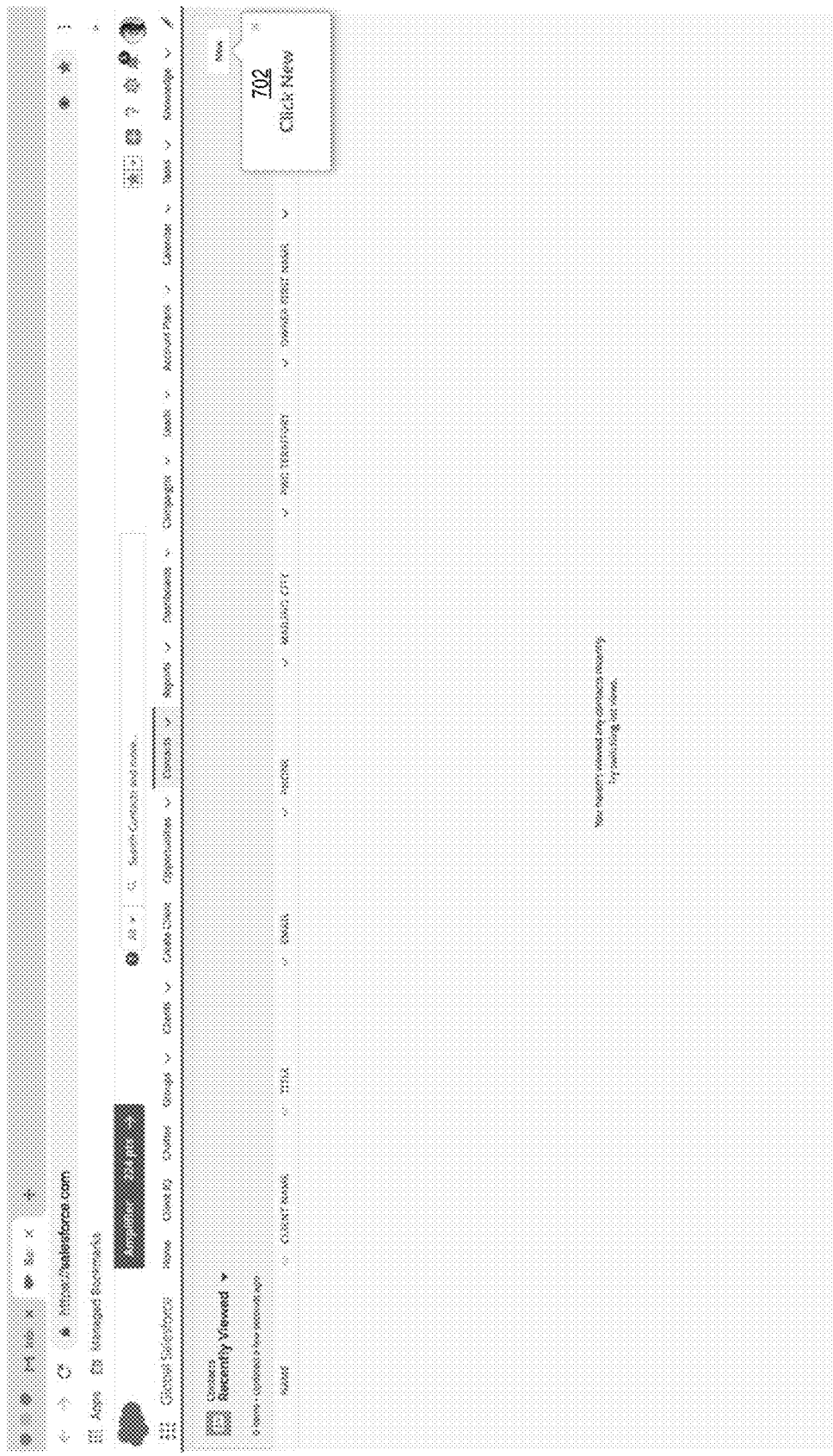
FIG. 7A depicts an exemplary user interface for a point-of-need learning walk-through, according to some embodiments.
Figure 7B:
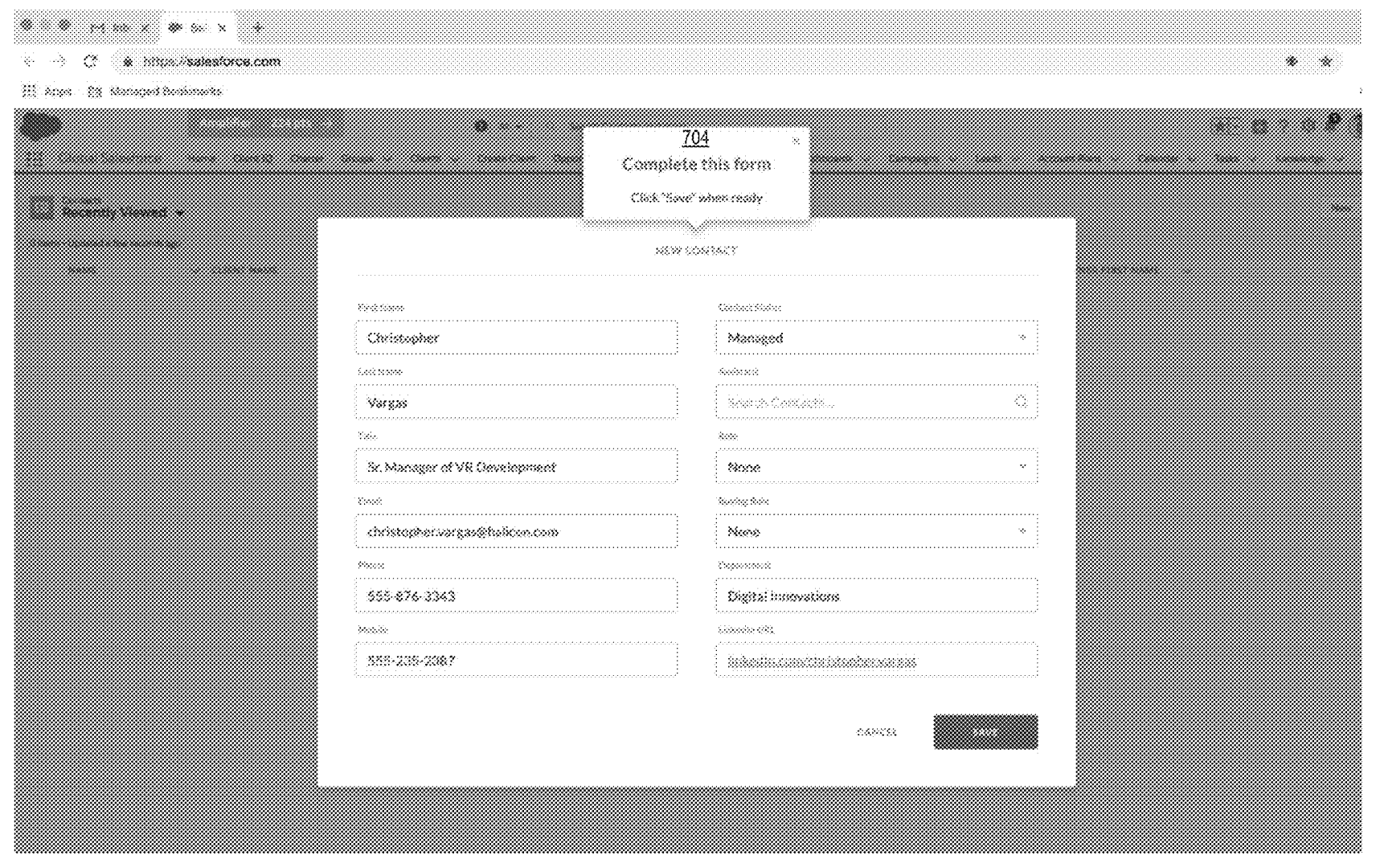
Figure 7C:
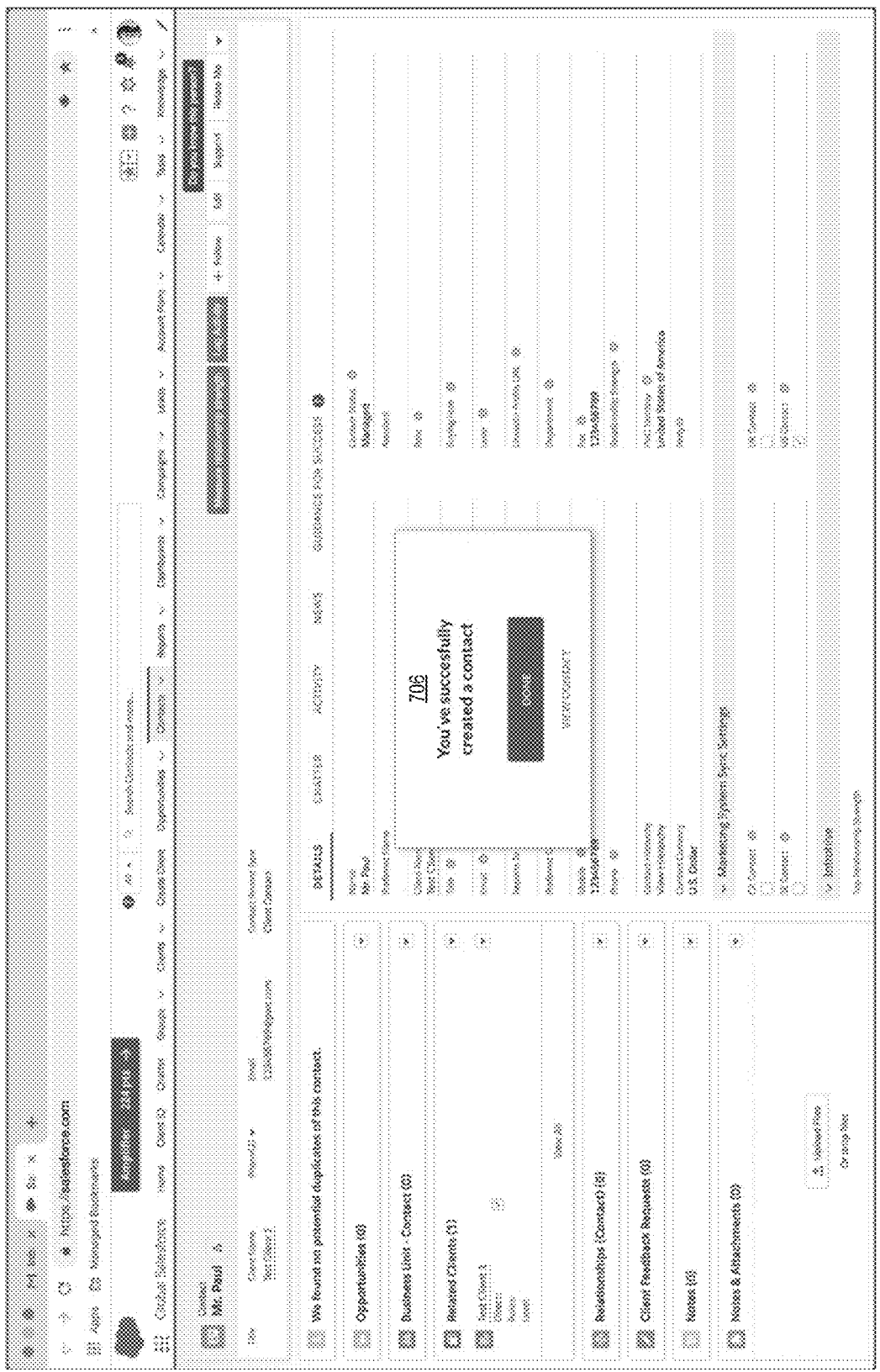
FIG. 7C depicts an exemplary user interface for a point-of-need learning walk-through, according to some embodiments.

Since the adoption platform is embedded within the enterprise software, when a link is activated by a user, the adoption platform opens up the native functionality of the enterprise software system, for example, Salesforce, so that the user can accomplish the indicated action, as described further below with reference to FIGS. 7A-C.

The point total displayed on the dashboard is for a designated challenge period. The challenge period can be for any predetermined time period, for example, 3 months, 1 month or a year. In some embodiments, only a single challenge related to a given enterprise software system is provided to an employee, thus allowing the employee to focus on a single goal during a challenge period. The goal for each time period may change. For example when the enterprise software is first rolled out, the theme of the game could be to learn basic tasks in the enterprise software. For example, if you are a sales rep on Salesforce, the actions that are listed on the dashboard could include creating a contact and updating a record. If you are a sales manager, may be the actions involve creating a report or cloning a dashboard. A later challenge period may have a different theme, for example, improving data integrity. The actions listed on the dashboard would then center on tasks that involve this theme, such as updating records and closing records.

The points listed on the dashboard incentivize user activities. The points can be used to allow users to compete against one another. Further, in some embodiments, the organization can provide prizes for employees that reach a predetermined point total during a challenge period and/or who finish high in the rankings (for example, above a certain percentage of employees or in a predetermined ranking of employees). Since the adoption platform includes an extension that is embedded in the enterprise software package, points may be given to an employee user regardless of whether they accomplish the action using the adoption platform (e.g., by initiating the action from the Dashboard) or whether they accomplish the action without the adoption platform directly through the enterprise software.

An administrator can also communicate to employees, for example, about the expiration of a challenge period or the beginning of a new challenge period through messages shown on the dashboard. Messages could also include, for example, how long the game will be, what are user roles, etc. By displaying messages on the dashboard, the number of emails to users can be minimized. In some embodiments, a personalized message can be shown before the Dashboard is launched at predefined time points (e.g., start of a new challenge, end of an existing challenge, first time logging into the enterprise software system) to provide a summary of the user's performance and provide a motivational message for the next challenge.

With reference to FIG. 1B, upon a selection (e.g., clicking) of the widget UI affordance 102, a user interface 100 is expanded into a full dashboard view over the enterprise software 104, as shown in FIG. 1B. The user interface 100 can be retracted into the widget (e.g., if the user clicks on back arrow 106, if the user clicks on the page 104).

The user interface 100 includes a navigation menu 108 and a content panel 110. The navigation menu provides entry points to a plurality of features (e.g., "Home," "Scoring Rules," "Help," "Active Analytics," "Behavior Activator") of the software adoption platform. In some embodiments, the plurality of features displayed is user-specific. For example, one or more features (e.g., "Active Analytics," "Behavior Activator") are only available, and thus visible on the navigation menu, to a subset of users (e.g., administrator users).

The content panel 110 displays content based on the feature selected from the navigation menu 108. As shown in FIG. 1B, when "Home" on the navigation menu is selected, the content panel 110 displays a score dial section 112, a leaderboard section 114, and an action section 116, as described below.

The score dial section 112 displays a user's progress toward a current challenge associated with the enterprise software 105. As shown, the score dial section 112 displays the user's total score for the challenge period ("224"), a goal for the challenge set by the organization for the current challenge ("800"), and a dial graphical representation depicting a percentage between the user's total score and the goal. In some embodiments, additional information associated with the challenge is displayed in the score dial section 112, such as the challenge name (e.g., "Win Big Sales in Q2"), the challenge period (e.g., "Jan. 1, 2020-Mar. 1, 2020"), and the number of days left in the challenge period.

Figure 1C:
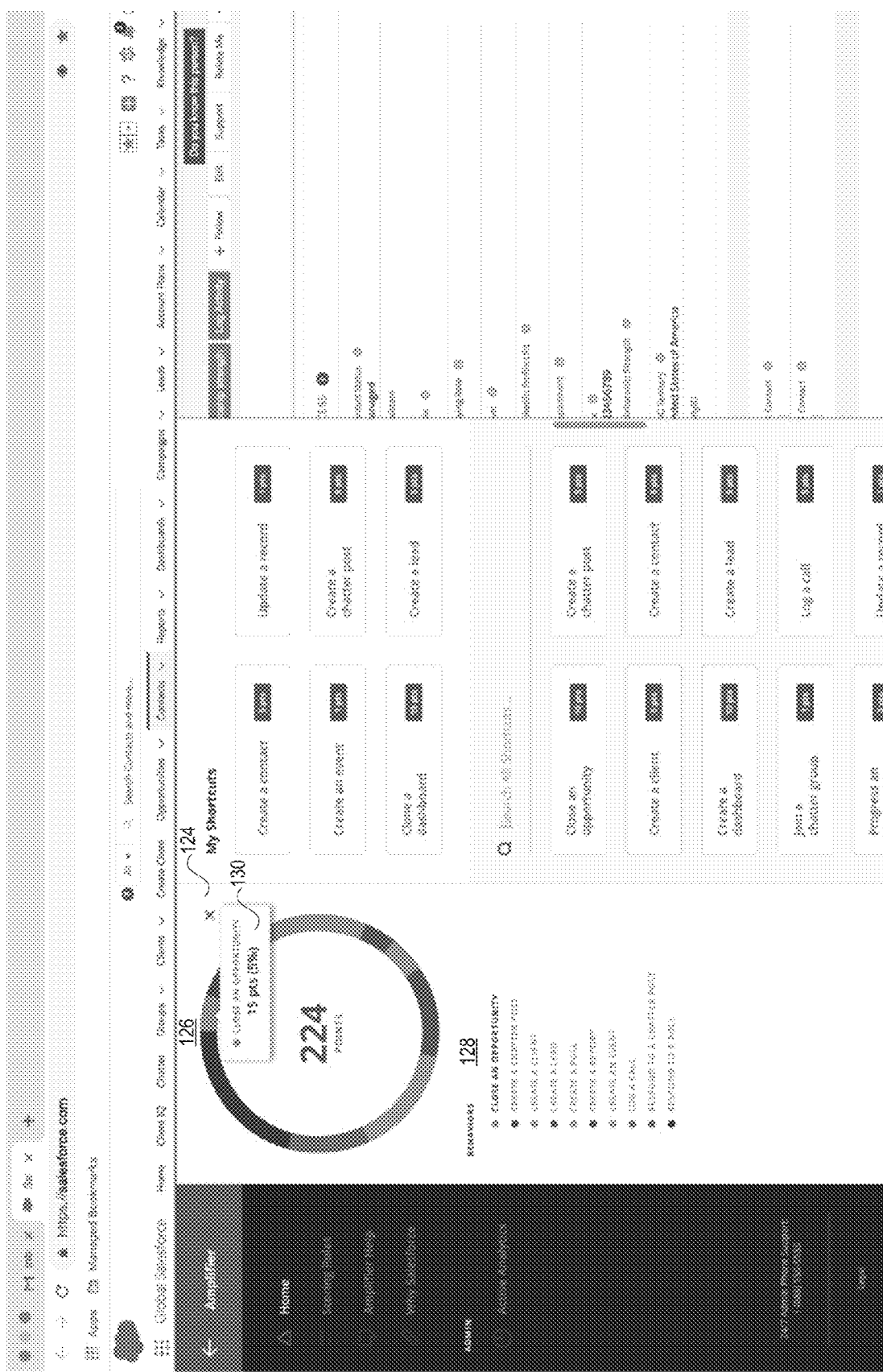
FIG. 1C illustrates an exemplary user interface of the software adoption platform, including an exemplary breakdown view, according to some embodiments.

In some embodiments, the score dial section 112 provides a breakdown view when the icon 122 is selected. FIG. 1C shows an exemplary user interface of the software adoption platform, including an exemplary breakdown view 124. The breakdown view 124 displays how the user has earned his or her current score. Upon the user's selection (e.g., mouse hovering, mouse click) of a color segment on the dial 126 or an action on the list 128, a tooltip (e.g., tooltip 130) is displayed to show how many points the respective action has resulted and how much it contributes to the user's current total score.

Turning back to FIG. 1B, the leaderboard section 114 shows how the user ranks and trends in relation to other users for the current challenge. Specifically, the leaderboard shows the user's current ranking, current total score, and trend (i.e., whether the user is moving up or down in the ranking). In the depicted example, the leaderboard is role-specific, including only other users in the same role as the user. In some embodiments, the leaderboard can be filtered by one or more predefined criteria, such as location, role, challenge period. In some embodiments, the leaderboard can show statistics of the filtered group, such as the total number of users, the total average score, and the average progress.

The action section 116 allows the user to quickly initiate an action and learn to perform such action within the enterprise software 104 to increase his or her score, thus providing a point-of-need learning experience. The action section provides shortcuts to a plurality of actions that can be performed within the enterprise software 104. In the depicted example, the actions that can be performed within Salesforce Sales Cloud include: "Create a contact," "Update a record," "Create an event," "Create a chatter post," "Create a lead," etc. For each action, a score associated with the respective action is displayed.

Upon a user selection (e.g., mouse click) of a particular action, the software adoption platform provides a guided, role-based walk-through of the action within the enterprise software 104. FIG. 7A-C depicts an exemplary guided, role-based walk-through after the user selects an action "Create a contact", according to some embodiments. Upon a user selection of shortcut 132 ("Create a contact") in the action section, a corresponding user interface for performing the respective action within the enterprise software is displayed, as shown in FIG. 7A. The software adoption platform causes a first message 702 ("Click New") to be displayed to signal the next step to be performed. As shown in FIG. 7B, after the user clicks on "New," the enterprise software displays another user interface, and software adoption platform causes a second message 704 ("Complete this form. Click 'Save' when ready.") to be displayed to signal the next step to be performed. After the user completes the form and clicks on "Save" in FIG. 7B, the user interface of the enterprise software is updated, and the software adoption platform causes a third message 706 ("You've successfully created a contact" along with potential follow-up steps) to be displayed, as shown in FIG. 7C.

In some embodiments, the walk-through is role-specific. For example, the action of "Create a new contact" may involve different steps depending on the user's role (e.g., partner, manager, director, sales associate). Accordingly, the software adoption platform provides the walk-through associated with the user's role.

Turning back to FIG. 1B, the action section 116 provides different lists of shortcuts for ease of access. The "My Shortcuts" section lists actions that are relevant or important to the user's role, which have been configured by the administer as described further below. Under "All Shortcuts," the user can search for specific actions to access a walk-through of a specific action.

Figure 1D:
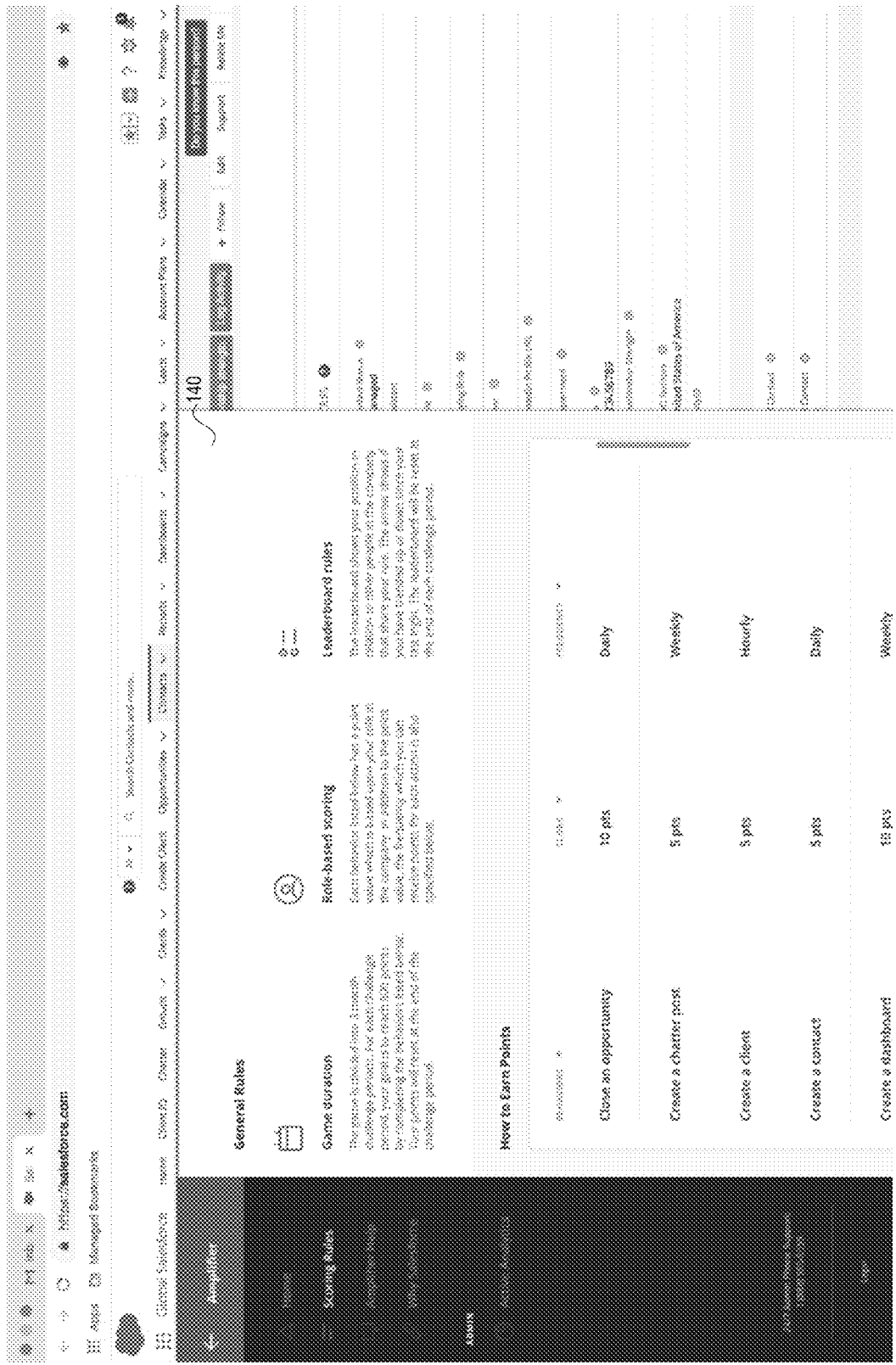
FIG. 1D illustrates an exemplary user interface of the software adoption platform, according to some embodiments.

FIG. 1D depicts an exemplary user interface 140 corresponding to the "Scoring Rules" feature of the software adoption platform, according to some embodiments. The user interface 140 allows the user to understand how the challenge and scoring work. Under "General Rules," three paragraphs are provided: game duration, role-based scoring, and leaderboard rules. These paragraphs can be configured by the administrator (e.g., via Behavior Activator) as described below. Under "How to Earn Points," the user can view the actions he or she can take to earn points, along with the associated score and the associated frequency (i.e., the maximum frequency that the user can perform the action at to receive scores). The list of actions can be sorted by name, score, and frequency.

Figure 2:
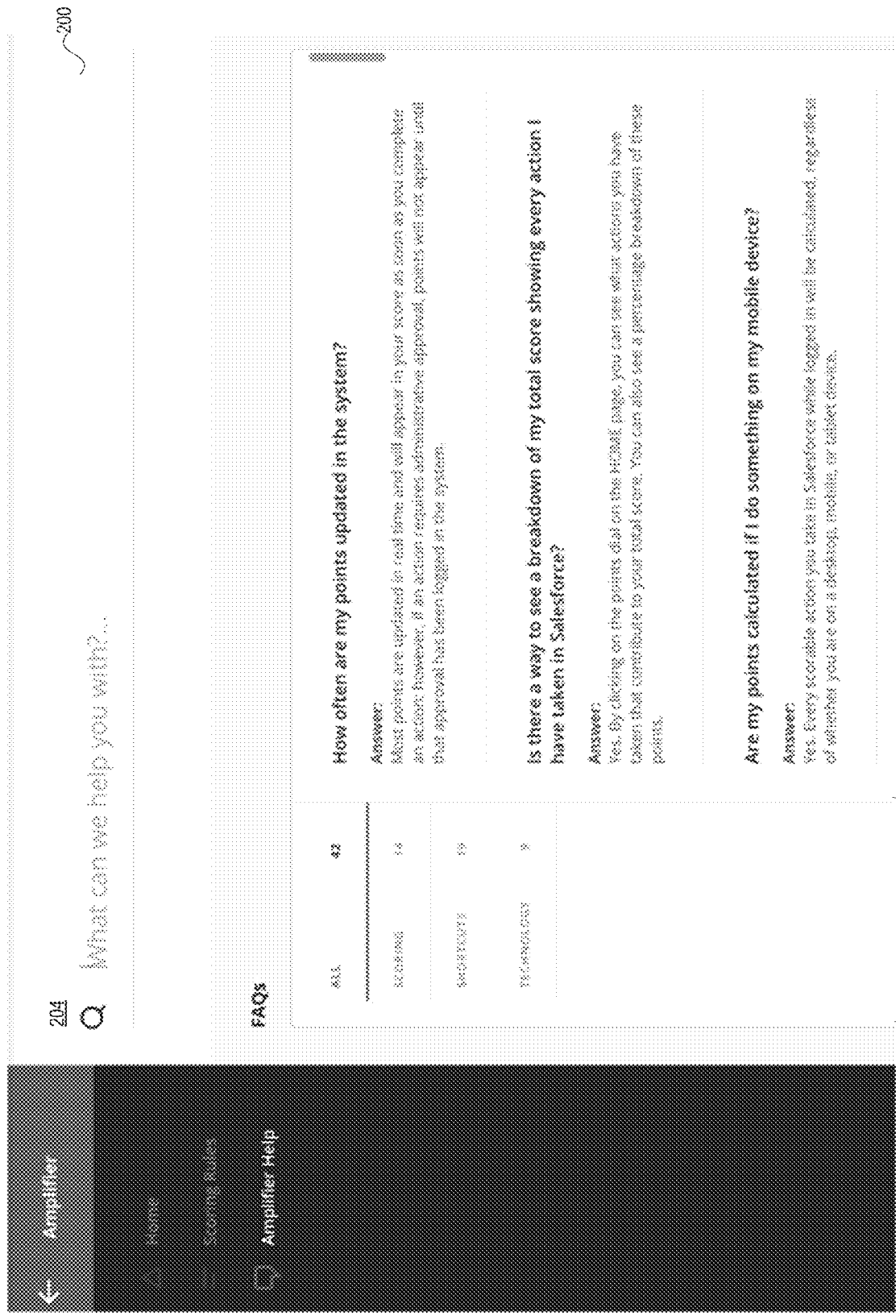
FIG. 2 illustrates an exemplary user interface for an employee FAQ page, according to some embodiments.

FIG. 2 illustrates an exemplary user interface 200 for an employee FAQ page, according to some embodiments. In the depicted example, the user interface 200 corresponds to the "Help" feature of the software adoption platform. This FAQ allows a user to quickly see answers to common questions about the adoption platform. The FAQ page may include video FAQs to support the user. Specifically, the user can view answers via categories, search for answers by specific words, submit a question to support, or chat with an administrator. Using the FAQ menu 202, the user can click on any of the categories on the left to filter down the questions and answers on the right. Using the search bar 204, the user can obtain a list of questions and answers based on query words. In some embodiments, the user can submit a question if he or she cannot find the answer. In some embodiments, if the user's search does not turn up any results, the user is automatically prompted to submit the question and/or to chat with an administrator via a chat UI.

Figure 3A:
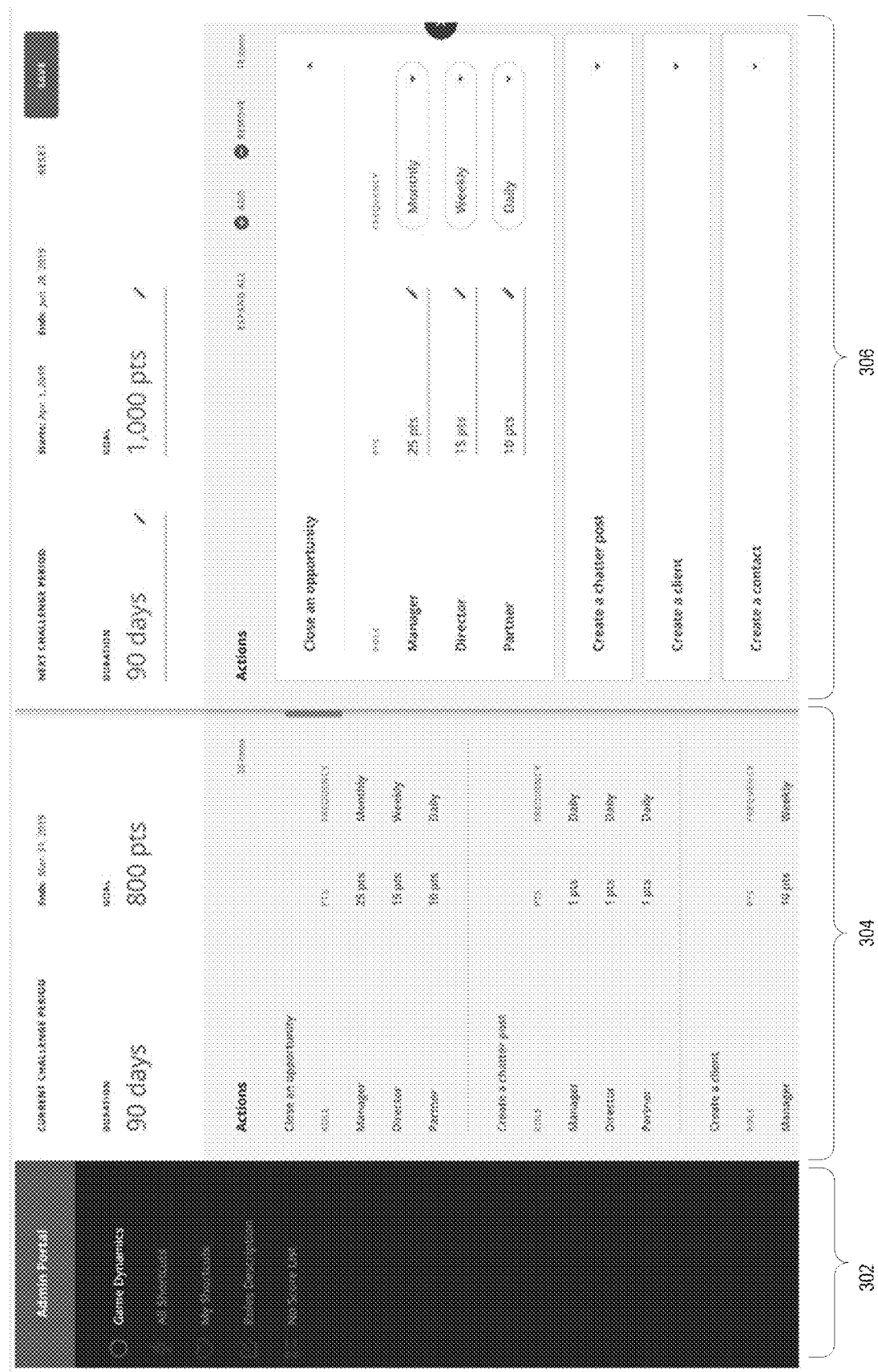
FIG. 3A illustrates an exemplary user interface for an administrative home portal, according to some embodiments.

FIG. 3A illustrates a user interface for an administrative home portal (also referred to as "Behavior Activator" in some embodiments), according to some embodiments. This home portal allows administrators to monitor and change the adoption platform. The Admin Portal or Behavior Activator is accessible (e.g., displayed on the navigation menu 108) to only administrators. In some embodiments, upon a selection of Admin Portal or Behavior Activator from the navigation menu, a new tab is launched to provide a separate menu 302. The menu 302 provides a plurality of administrator features, including "Challenge Dynamics," "All Shortcuts," "My Shortcuts," and "Rules Description."

With reference to FIG. 3A, using the "Challenge Dynamics" feature, the administrator can view the configurations of the current challenge period (i.e., via panel 304) and edit configurations of the next challenge period (i.e., via panel 306). In the depicted example, the administrator can configure the name, duration, and goal for the next challenge period (e.g., the total number of points that a user should strive for) via panel 306. In some embodiments, the system can automatically suggest names, durations, and goals based on the enterprise software, the organization adopting the enterprise software (e.g., industry, seasonality, and competitor and historical organization data), or a combination thereof.

Further, the administrator can set which actions are included in the challenge. This can be selected as per the business needs and the objective of a specific challenge. For each action to be included, the administrator can set the associated points earned for the respective action for each role, and the maximum frequency the respective action can be performed. This way, the administrator can design the challenge to drive certain behaviors for different roles, as different actions can be relevant for different roles in the organization. The frequency setting helps to guide a user to regularly perform actions and limit any potential exploitation of system by completing some actions by a huge number.

In some embodiments, each challenge period is associated with a goal. In the depicted example in FIG. 3, the goal for the current challenge period is 800 points, and the goal for the next challenge period is 1,000 points. The same goal applies to all roles in the organization.

Using the "All Shortcuts" feature on the menu 302, the administrator can set which shortcuts are accessible to all users (e.g., via the "All Shortcuts" list in the action section 116 of FIG. 1B).

Using the "My Shortcuts" feature on the menu 302, the administrator can set specific shortcuts and their respective orders to be displayed to specific roles (e.g., via the "My Shortcuts" list in the action section 116 of FIG. 1B). The My Shortcuts list can display actions in the order of importance to specific roles.

Figure 3B:
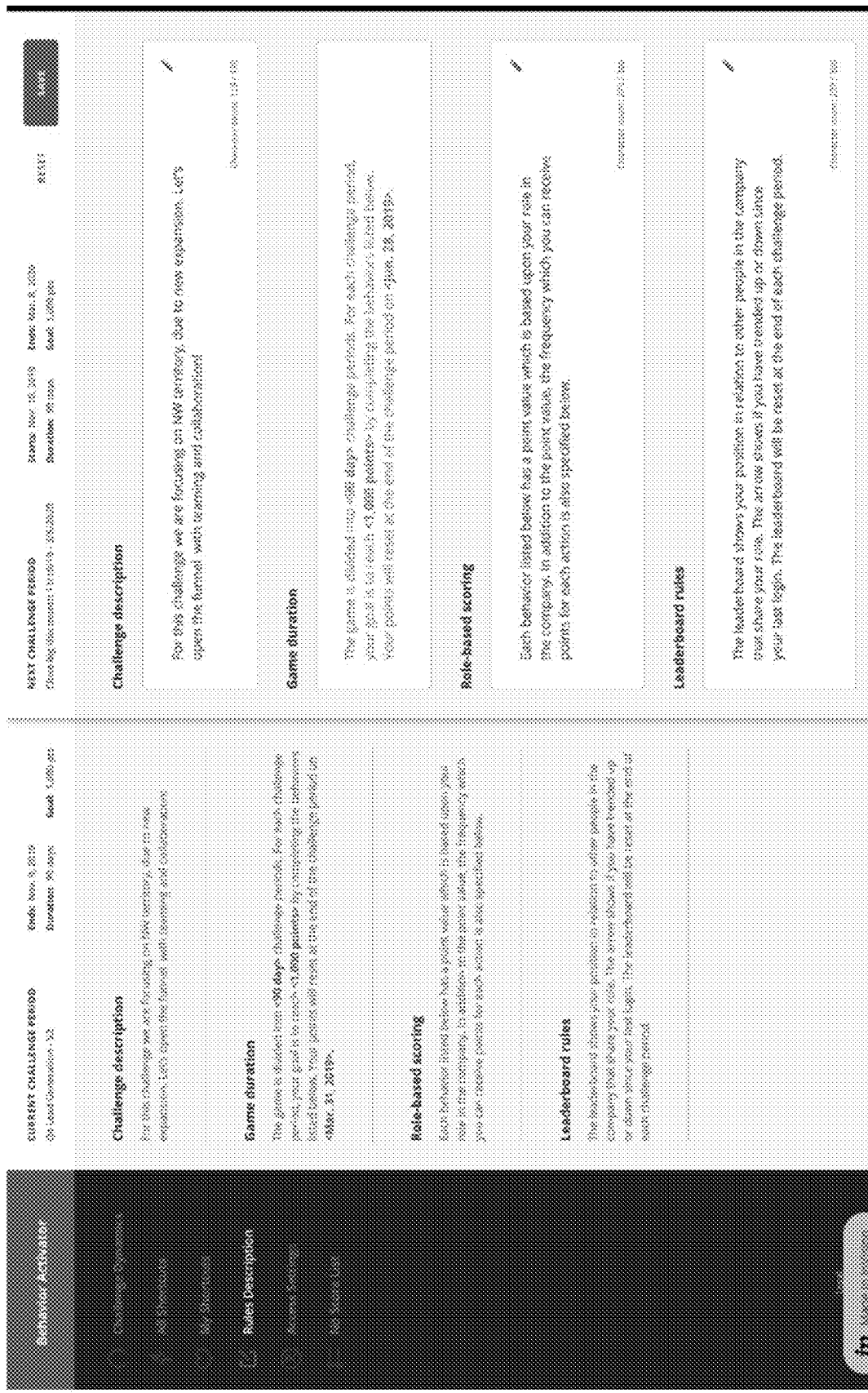
FIG. 3B illustrates an exemplary user interface for an administrative home portal, according to some embodiments.

Using the "Rule Description" feature on the menu 302, the administrator can draft and edit the content displayed on the user interface 140 of FIG. 1D. As shown in FIG. 3B, some of the content (e.g., duration of challenge period) is auto-populated based on the administrator's inputs under Challenge Dynamics, while some of the content (e.g., leaderboard rules) is fully editable up to a predefined number of characters.

Using the "No Score List" feature on the menu 302, the administrator can add one or more users such that those users are excluded from appearing on the leaderboard. In some embodiments, data for those users on the "No Score List" are not collected by the adoption platform.

Using the "Access Settings" feature on the menu 302, the administrator can add one or more users such that those users gain access to administrator features, such as Behavior Activator and Active Analytics.

Figure 4A:
FIG. 4A illustrates an analytics user interface for the administrative portal, according to some embodiments.

FIG. 4A illustrates an analytics user interface for the administrative portal, according to some embodiments. This user interface allows an administrator to see analytics about actions taken on the adoption platform over time. The administrator can then view trends and decide how different challenge periods went and change the goals and actions in the future. Active Analytics provides automated data reporting that highlights change throughout the adoption life cycle. Thus, an administrator can view what is working, what areas need more focus, and where there are opportunities to optimize the overall change plan. Exemplary questions that can be answered by Active Analytics include: the trend of logins into the enterprise software, which role has been completing maximum or minimum actions within a time period, how has the aggregate scores trended over time, what some of the top FAQ searches are, how each role is completing actions over time, how overall actions completions over time are.

As shown in FIG. 4A, exemplary data visualizations include the numbers of various types of actions performed over time, the total number of actions performed over time, the breakdown of points by action types.

Figure 4B:
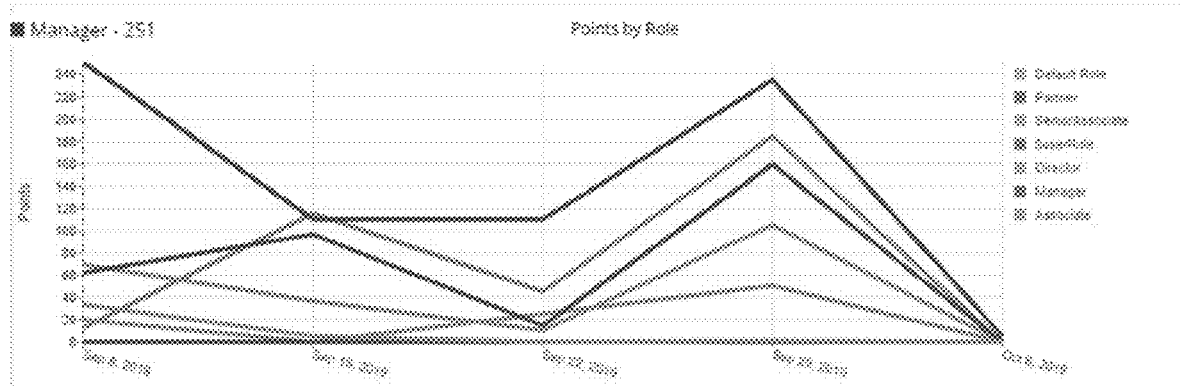
FIG. 4B illustrates an analytics user interface for the administrative portal, according to some embodiments.
Figure 4C:
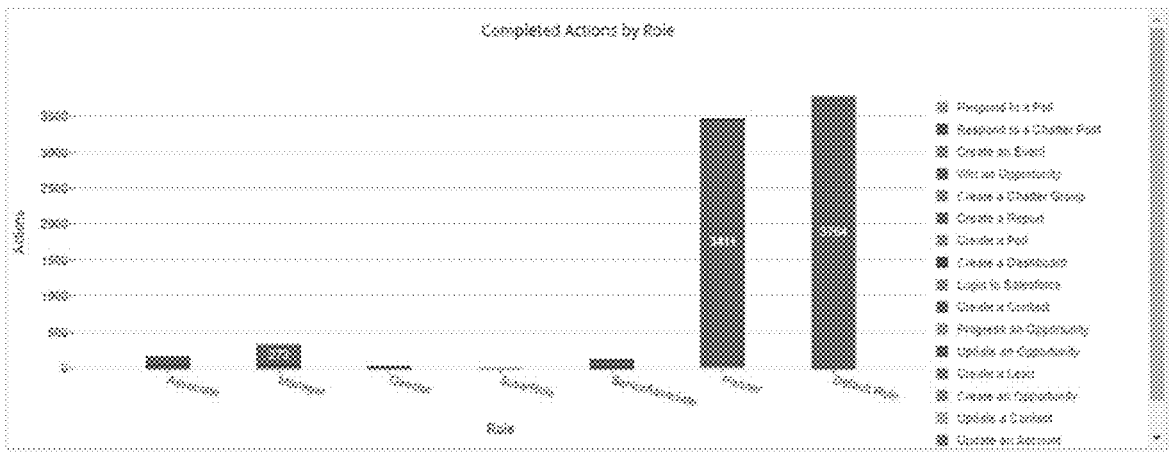
FIG. 4C illustrates an analytics user interface for the administrative portal, according to some embodiments.

FIG. 4B-C depicts additional exemplary data reporting features provided by the software adoption platform, according to some embodiments. FIG. 4B provides a score trend by role report demonstrating how the software adoption platform has contributed to the adoption of enterprise software. It demonstrates the trend of adoption (e.g., increasing, decreasing, or staying flat) for each role.

FIG. 4C provides a "Completed Actions by Role" report, demonstrating how users of different roles are completing the enterprise software actions for a selected date-range. It shows which role has performed the maximum or minimum number of actions, what the actions performed by different roles are, how many actions of different types that various roles have performed.

Figure 4D:
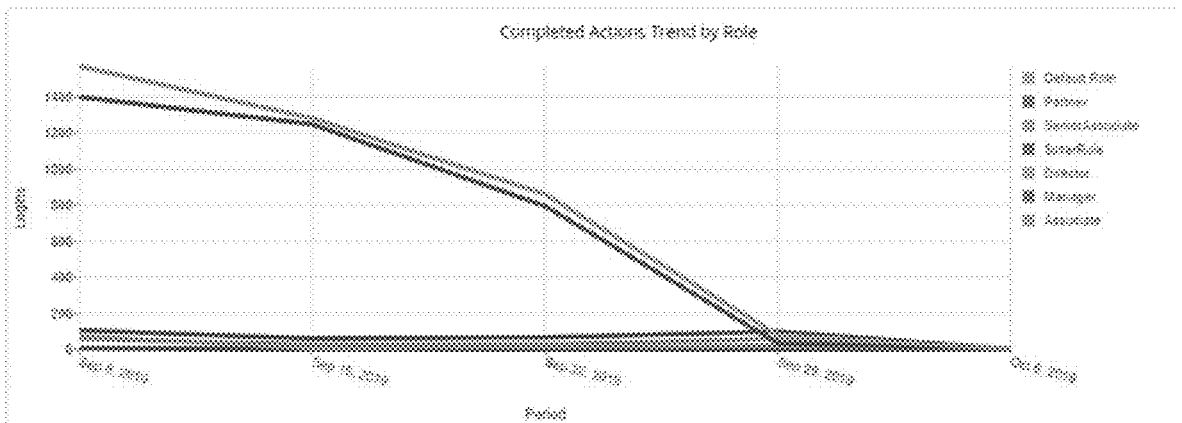
FIG. 4D illustrates an analytics user interface for the administrative portal, according to some embodiments.

FIG. 4D provides a "Completed Actions Trend by Role" report demonstrating how different roles are completing actions over time. It demonstrates the trend of action completions for each role—whether the action completion of a particular role is increasing, decreasing, or staying flat. In some embodiments, the software adoption platform provides a "Logins Over Time" report demonstrating how logins are trending over time. It demonstrates if the logins are at a level that is inline with the optimum usage of the enterprise software. The administrator can also identify whether the software adoption platform has helped in increasing logins and thereby the adoption and value realization of the enterprise software.

In some embodiments, the software adoption platform provides a "Top FAQ Keyword Searches" report demonstrating the search keywords that users have entered. It demonstrates where users are having difficulty in using the software adoption platform or the enterprise software. In some embodiments, one or more reports provided by the software adoption platform can be filtered by date ranges (e.g., last month, last 6 months, current challenge period, all challenge periods). The trend reports will auto-adjust the granularity based on the reporting duration.

Figure 5:
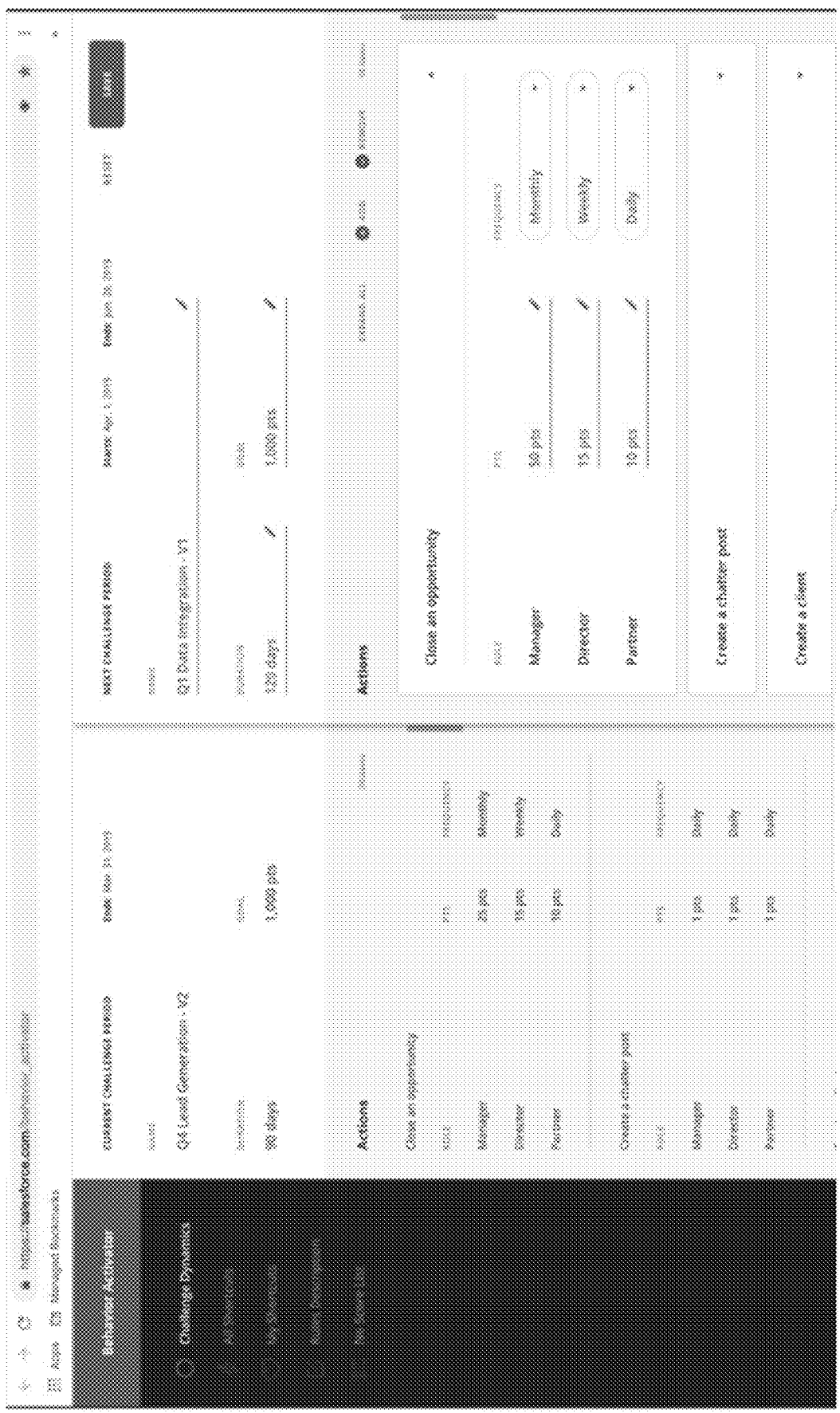
FIG. 5 illustrates an exemplary user interface for the administrative portal, according to some embodiments.

FIG. 5 illustrates another user interface for the administrative portal, according to some embodiments. As described above, the administrative portal allows the administrator to customize all features of the adoption platform including, for example, the desired actions, the rolls for different users, the points for each action taken by a user with a specified roll and the period of the challenge period. This allows the actions and points provided for accomplishing the action to be specified for a given user role. So an employee in the role of a director may have different actions than an employee in the role of a partner, etc. This allows the platform to incentivize different people to preform different actions. In some embodiments, the system can utilize machine learning based on the analytics during one or more challenge periods to suggest new configurations for future challenge periods. For example, upon the end of a challenge period, you the platform may suggest a list of platform presets based on analytics from the platform, industry trends, the level of business maturity, or other factors. In some embodiments, these presets are automatically modified by the platform.

Figure 6A:
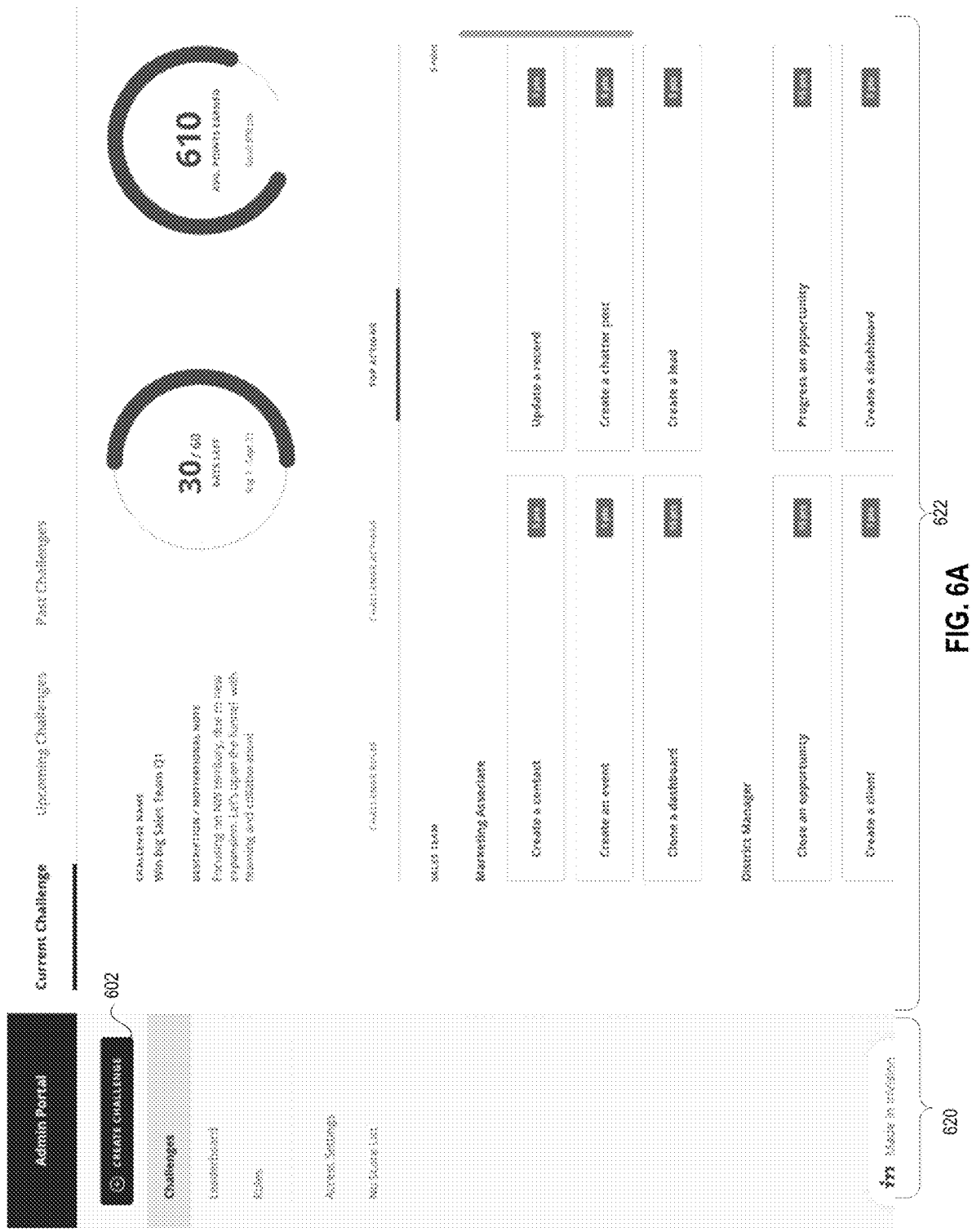
FIG. 6A illustrates an exemplary user interface for an administrative home portal, according to some embodiments.
Figure 6B:
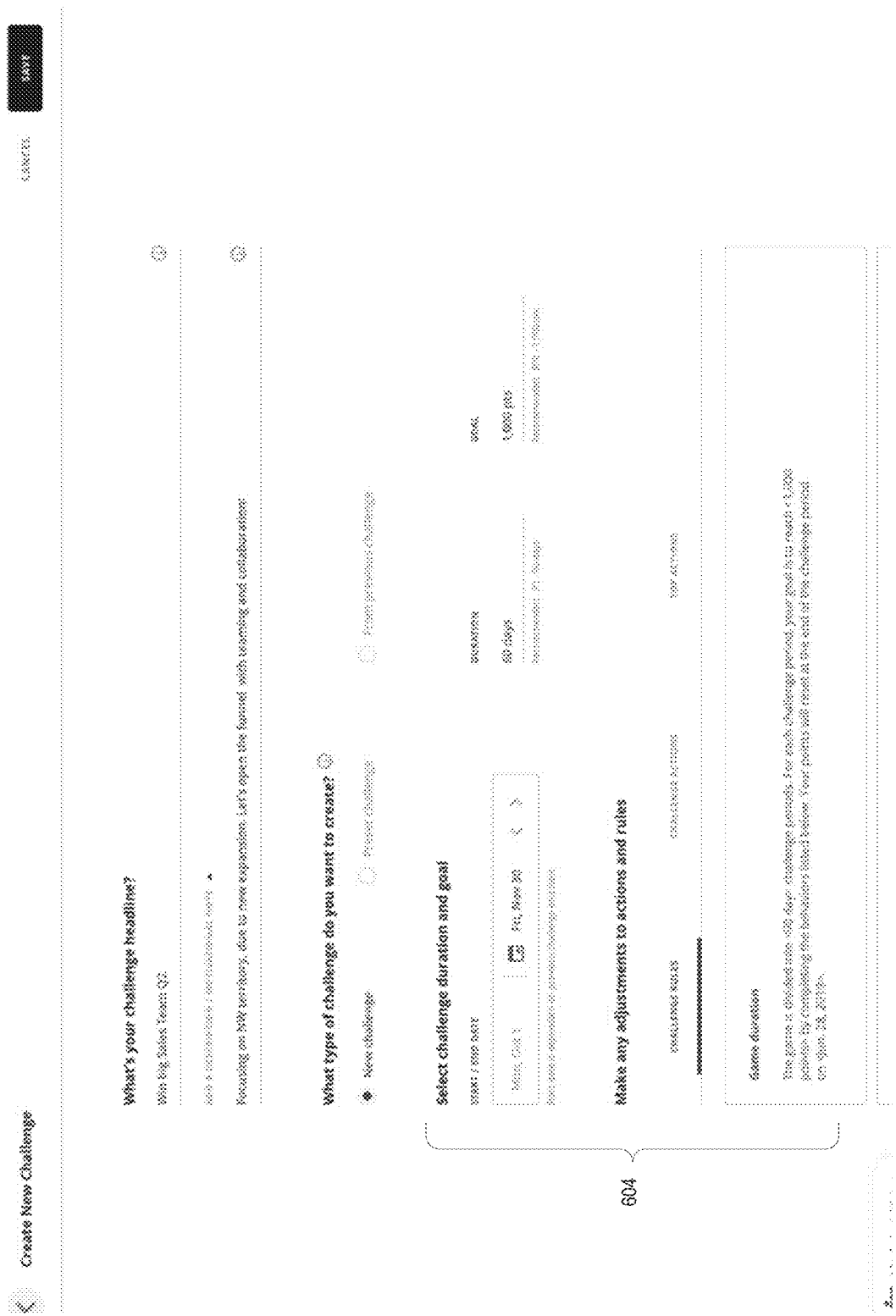
FIG. 6B illustrates an exemplary user interface for an administrative home portal, according to some embodiments.

FIG. 6A illustrate another exemplary user interface for the administrator portal, according to some embodiments. As shown, the user interface comprises a software button 602 ("CREATE CHALLENGE"). As shown in FIG. 6B, upon selecting the software button 602, the software adoption platform provides a user interface for specifying the parameters or settings of the challenge, including a name, a description, and a type. In the depicted example, the administrator can select from three types of challenges: "New challenge," "Preset Challenge," and "From previous challenges."

If the administrator selects "New challenge" as shown in FIG. 6B, the adoption platform provides a set of UI controls 604 to manually enter all parameters of the new challenge, including challenge duration, goal, rules, actions, etc.

Figure 6C:
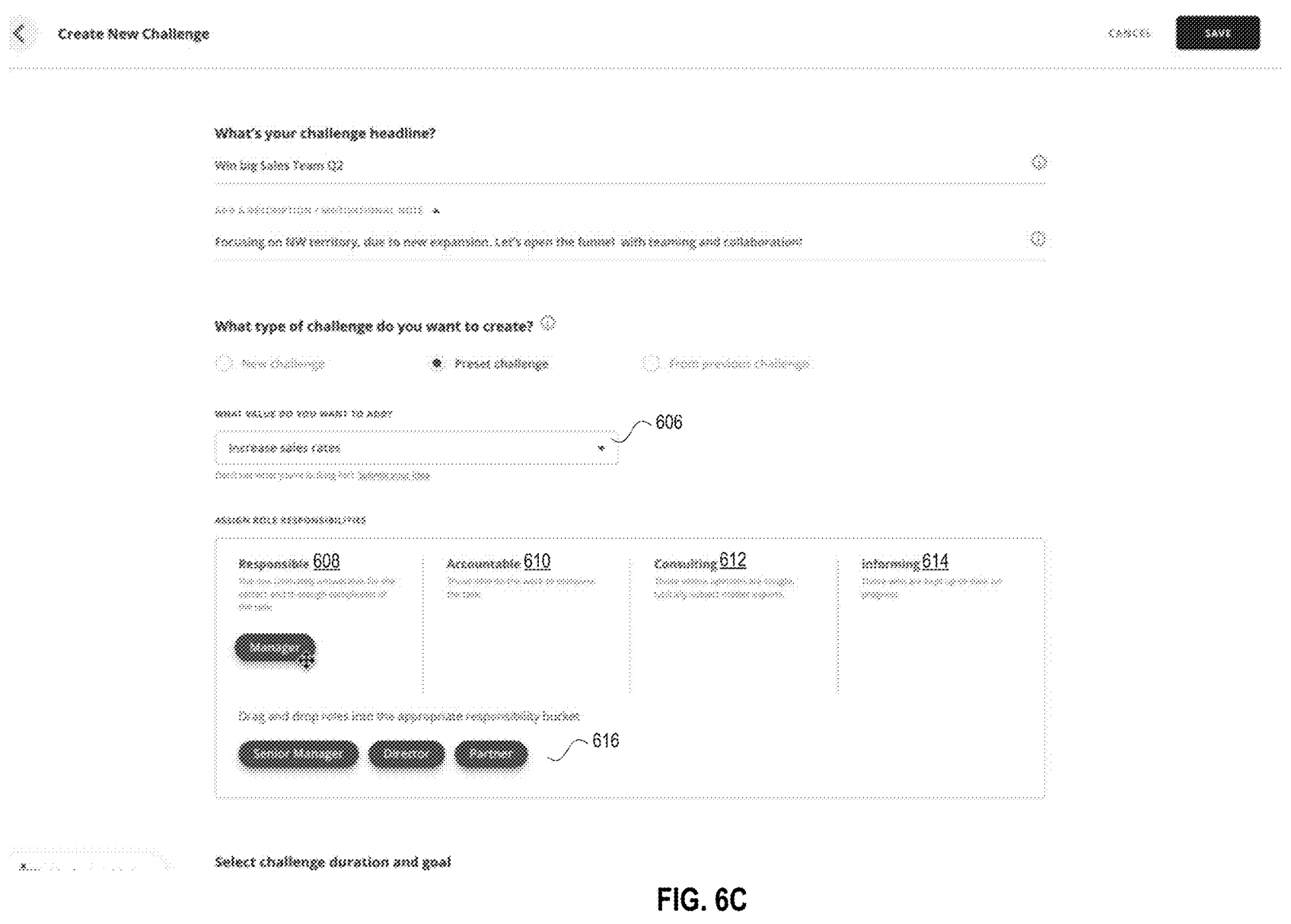

If the administrator selects "Preset challenge," the adoption platform provides a plurality of predefined value realization themes (or objectives) via a drop-down menu 606 (e.g., "Increase sales rates," "Grow existing accounts," "Activate stagnant accounts," "Decrease lead-to-close time," "Encourage teams to collaborate"), as shown in FIG. 6C. The adoption platform further allows the administrator to assign various roles in the organization (e.g., "senior manager," "director," "associate") to a plurality of predefined responsibility types. In the depicted example, there are four predefined responsibility types: "Responsible," "Accountable," "Consulting," and "Informing." As shown, the user interface includes four areas 608, 610, 612, and 614 corresponding to the four predefined responsibility types. The user interface further includes a plurality of user affordances 616 corresponding to the various roles in the organization. The user can drag and drop each role into one of the predefined responsibility types.

Based on the administrator's assignment of roles to responsibility types, the adoption platform can automatically create a draft challenge or challenge. In some embodiments, a predefined theme is pre-associated with a plurality of predefined actions; further, each of the plurality of predefined actions can result in different scores for different responsibility types. For example, a theme "increase sales rates" can involve a plurality of predefined actions including "Create a client," and the score rewarded for completing the action "Create a client" can be higher to the "Responsible" party than to the "Informing" party. In some embodiments, an administrator can modify the pre-association between a theme and actions, as well as the pre-association between each action and scores for different responsibility types.

If the administrator selects "From previous challenge," the administrator can choose a previous challenge as a starting point for drafting a new challenge. When the administrator chooses a previous challenge, a new challenge is created with parameters (e.g., duration, rules) pre-populated based on the previous challenge and the administrator can edit the new challenge further.

Turning back to FIG. 6A, the user interface also comprises a navigation menu 620, which lists additional features including "Challenge," "Leaderboard," "Rules," "Access Settings," and "No Score List." When the user selects "Challenges," the content panel 622 displays three tabs: "Current Challenge," "Upcoming Challenge," and "Past Challenges." Under "Current Challenge," information regarding the current challenge, including name, description, rules, actions, top actions, and statistics (e.g., average points earned) are displayed.

With reference to FIG. 6D, under the "Upcoming Challenges" tab, the administrator can view a list of future challenges. Each future challenge can be edited, duplicated, and deleted. With reference to FIG. 6E, under the "Past Challenges" tab, the administrator can view a list of past challenges and associated statistics. Each past challenge can be duplicated such that a new challenge is created with pre-populated parameters based on the past challenge.

Figure 6F:
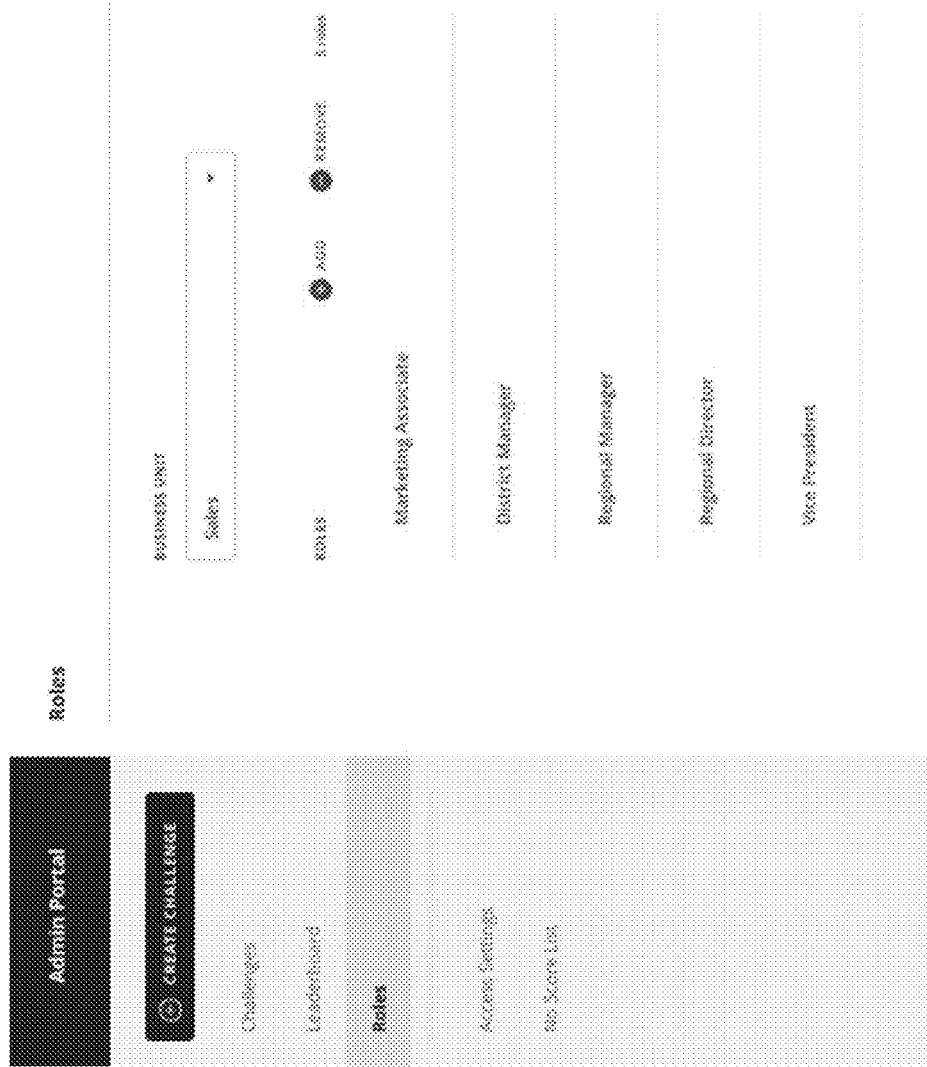
FIG. 6F illustrates an exemplary user interface for an administrative home portal, according to some embodiments.

With reference to FIG. 6F, upon selection of "Roles" on the navigation menu, the administrator can add or remove roles in various business units of the organization.

Figure 6G:
FIG. 6G illustrates an exemplary user interface for an administrative home portal, according to some embodiments.
Figure 6H:
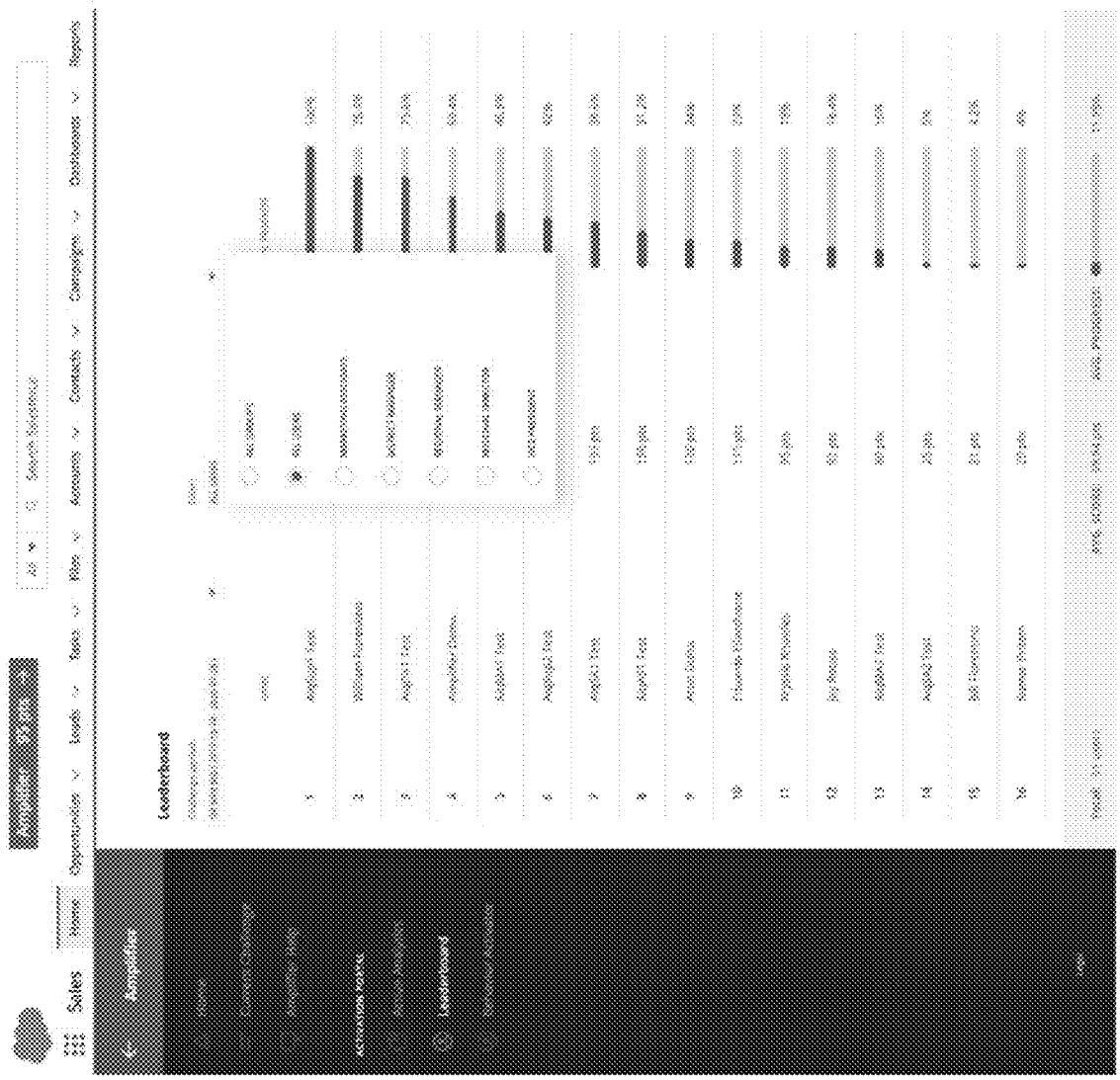
FIG. 6H illustrates an exemplary user interface for an administrative home portal, according to some embodiments.
Figure 6I:
FIG. 6I illustrates an exemplary user interface for an administrative home portal, according to some embodiments.

With reference to FIG. 6G, upon selection of "Leaderboard" on the navigation menu, the administrator can view performance of various users and groups for various challenge periods. This way, the administrator can obtain tailored views of how different entities in the organization are doing and follow up accordingly. As shown in FIGS. 6G and 6H, the leaderboard can be filtered by challenge periods and user roles. As shown in FIG. 6I, under the filter "All Groups," the leaderboard shows the performance of various user roles (e.g., regional manager, regional director) in the company.

Figure 8:
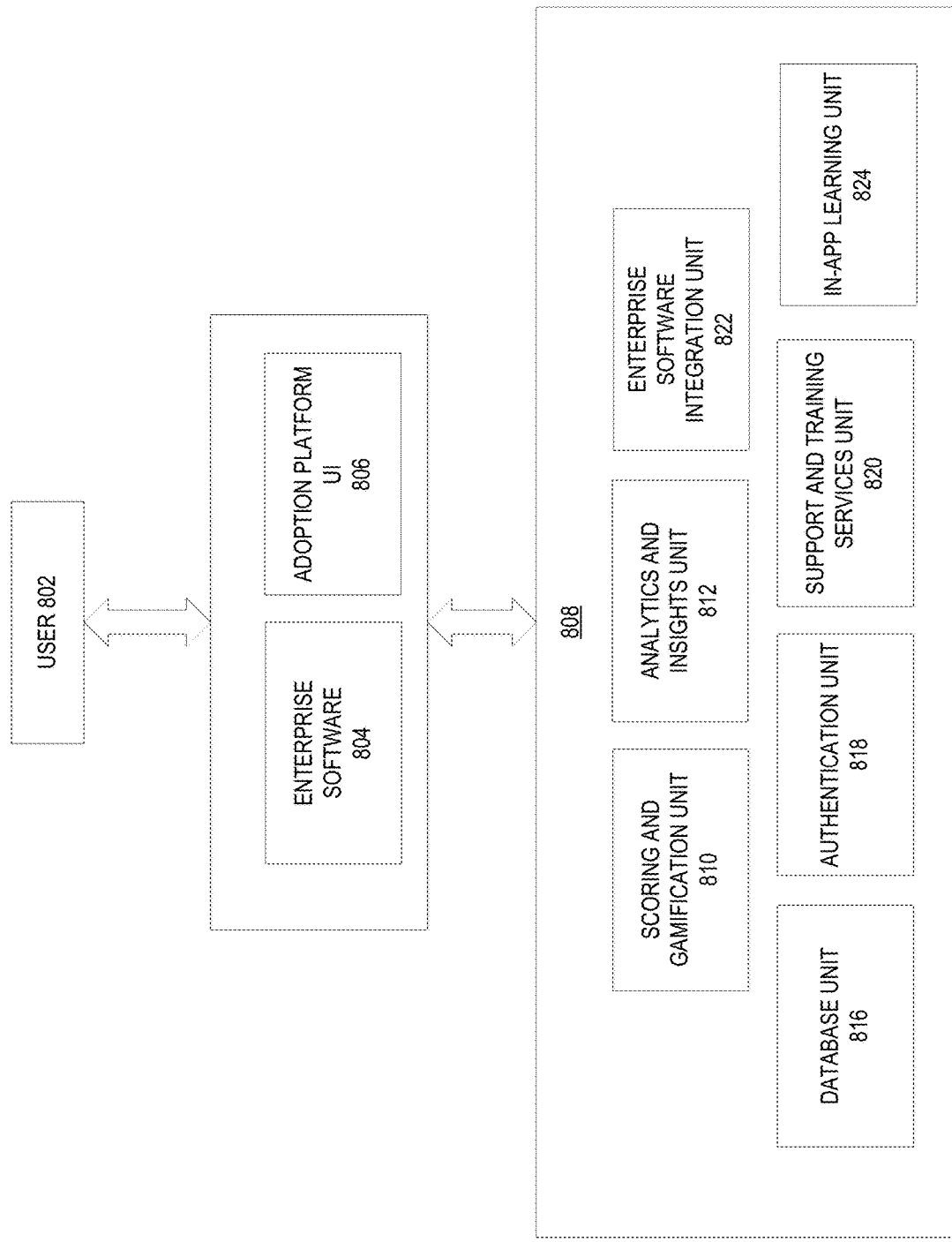
FIG. 8 depicts an exemplary process, according to some embodiments.

FIG. 8 illustrates a block diagram of an exemplary software adoption platform, according to some embodiments. A user 802 can access an enterprise software system 804, for example, via a web browser. The user can further access the user interfaces of the adoption platform 806 via an entry point. In some embodiments, the user interfaces of the adoption platform are implemented as a web-browser plug-in and the entry point is a widget displayed in the web browser. In some embodiments, the user interfaces of the adoption platform 806 can be expanded into a larger view upon selection of the widget and be overlaid on the user interfaces of the enterprise software 804.

The software adoption platform comprises a backend subsystem 808. The backend subsystem 808 can be located on one or more client devices, one or more server devices, or any combination thereof. The backend subsystem 808 can automatically obtains data from the enterprise software 804. In some embodiments, the backend subsystem 808 obtains the data via API calls. The data collection can be via polling or event-based. The obtained data includes data associated with the user, including user name, the user's role, the user's location, a user ID, whether the user is active, the user's business unit, one or more activities of the user in the enterprise software (e.g., unique identifiers associated with the actions), etc.

The software adoption platform comprises a database unit 816. In some embodiments, the database unit 816 comprises a plurality of tables or other types of data structures that allow the software adoption platform to draw associations and correlations among the data. In some embodiments, the database unit comprises data related to companies or organizations (e.g., names and unique identifiers assigned to the companies or organizations), challenges (e.g., duration data, description data, etc.), user attributes (e.g., user's name, role, unique identifier, etc.), scoring rules, rankings, behavioral metadata, messages customized based on a user's challenge score, value statements (e.g., by platform, industry, sub-industry, company size, etc.), and preset configurations.

Based on data obtained from the enterprise software 804, the software adoption platform can load tables from the database unit 816 and update the tables. For example, in response to the user performing an action in the enterprise software 804, the scoring and gamification unit 810 can calculate a new score for the user based on the user's role, the action, the user's frequency in performing the action, and the scoring rules. Further, the scoring and gamification unit 810 can update the ranking of the users. In some embodiments, the scoring and gamification unit updates the ranking of the users periodically.

The adoption platform UI 806 (e.g., leaderboard, user's score) can be updated based on the data in the database unit 816. In some embodiments the update is event-based (e.g., when the user's score has changed). In some embodiments, the update is periodic.

The software adoption platform further comprises an analytics and insight unit 812 for calculating various analytics (those described with reference to FIGS. 4A-D) based on the data in the database unit. In some embodiments, the analytics and insight unit 812 can automatically recommend actions if a metric meets a predefined threshold. The software adoption platform further comprises an authentication unit 818 for ensuring the adoption platform is accessed by an authorized user. In some embodiments, the authentication unit 818 authenticates a user based on an authentication component of the enterprise software 804. The software adoption platform further comprises support and training services unit 820 for providing user support (e.g., chatting services).

The software adoption platform further comprises an enterprise software integration unit 822. The software adoption platform can communicate with the enterprise software 804, for example, to receive user actions within the enterprise software 804.

In some embodiments, the adoption platform can support one or more enterprise software besides the enterprise software 804. When a new enterprise software is added, the enterprise software integration unit 822 can be connected to the new enterprise software to receive user actions within the new enterprise software. The other units (e.g., scoring and gamification unit) are communicatively coupled to the enterprise software integration unit and can be updated accordingly such that scores, rankings, and analytics can be provided for the new enterprise software.

In some embodiments, the enterprise software integration unit can include various definitions, functions, APIs, and algorithms for integrating the enterprise software 804 and the adoption platform. In some embodiments, when a new enterprise software is added to the software adoption platform, an administrator can manually define the following: actions within the enterprise software (and associated action IDs), roles that can perform actions within the enterprise software, and a unique identifier of the enterprise software.

The software adoption platform further comprises an in-app learning unit 824. The in-app learning unit can include role-specific walk-throughs for various actions within the enterprise software 804.

In some embodiments, the adoption platform can support multiple companies or organizations. For each organization, a separate secure database can be maintained.

FIG. 9 illustrates process 900, according to various examples. Process 900 is performed, for example, using one or more electronic devices implementing a software platform. In some examples, process 900 is performed using a client-server system, and the blocks of process 900 are divided up in any manner between the server and a client device. In other examples, the blocks of process 900 are divided up between the server and multiple client devices. Thus, while portions of process 900 are described herein as being performed by particular devices of a client-server system, it will be appreciated that process 900 is not so limited. In other examples, process 900 is performed using only a client device or only multiple client devices. In process 900, some blocks are, optionally, combined, the order of some blocks is, optionally, changed, and some blocks are, optionally, omitted. In some examples, additional steps may be performed in combination with the process 900. Accordingly, the operations as illustrated (and described in greater detail below) are exemplary by nature and, as such, should not be viewed as limiting.

At block 902, a system (e.g., an electronic device) displays a window associated with a software system. At block 904, the system displays, within the window, a user interface corresponding to a software adoption platform, wherein the user interface corresponding to the software adoption platform comprises: a user-specific score associated with the software system, and a plurality of user affordances corresponding to a plurality of actions within the software system. At block 906, the system, upon selection of a user affordance of the plurality of user affordances, automatically displays a page of the software system in the window based on the selected user affordance. At block 908, the system automatically displays one or more messages overlaid over the page of the software system, wherein the one or more messages are generated by the software adoption platform.

Figure 10:
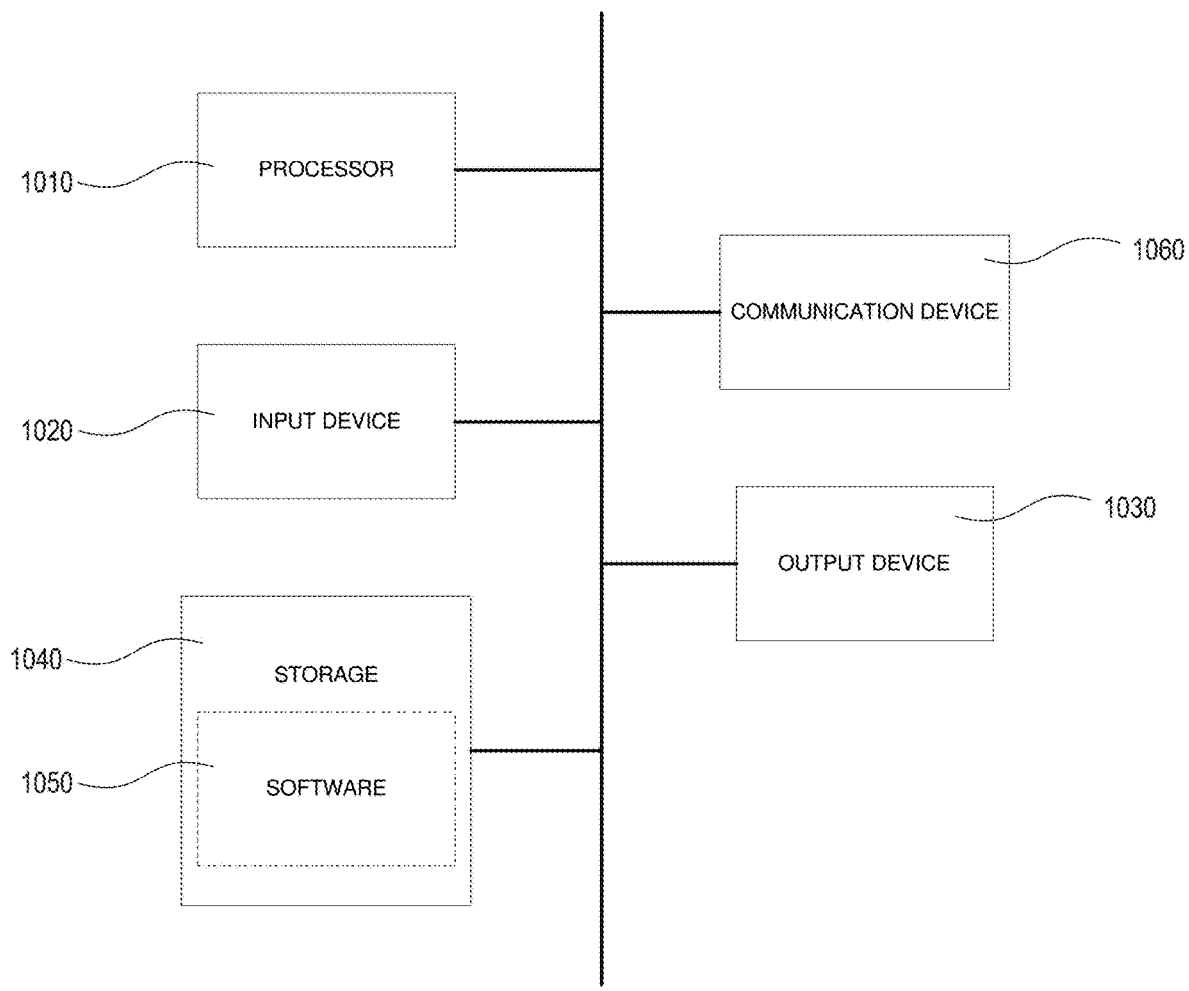
FIG. 10 illustrates an exemplary electronic device in accordance with some embodiments.

FIG. 10 illustrates an example of a computing device in accordance with one embodiment. Device 1000 can be a host computer connected to a network. Device 1000 can be a client computer or a server. As shown in FIG. 10, device 1000 can be any suitable type of microprocessor-based device, such as a personal computer, workstation, server or handheld computing device (portable electronic device) such as a phone or tablet. The device can include, for example, one or more of processor 1010, input device 1020, output device 1030, storage 1040, and communication device 1060. Input device 1020 and output device 1030 can generally correspond to those described above, and can either be connectable or integrated with the computer.

Input device 1020 can be any suitable device that provides input, such as a touch screen, keyboard or keypad, mouse, or voice-recognition device. Output device 1030 can be any suitable device that provides output, such as a touch screen, haptics device, or speaker.

Storage 1040 can be any suitable device that provides storage, such as an electrical, magnetic or optical memory including a RAM, cache, hard drive, or removable storage disk. Communication device 1060 can include any suitable device capable of transmitting and receiving signals over a network, such as a network interface chip or device. The components of the computer can be connected in any suitable manner, such as via a physical bus or wirelessly.

Software 1050, which can be stored in storage 1040 and executed by processor 1010, can include, for example, the programming that embodies the functionality of the present disclosure (e.g., as embodied in the devices as described above).

Software 1050 can also be stored and/or transported within any non-transitory computer-readable storage medium for use by or in connection with an instruction execution system, apparatus, or device, such as those described above, that can fetch instructions associated with the software from the instruction execution system, apparatus, or device and execute the instructions. In the context of this disclosure, a computer-readable storage medium can be any medium, such as storage 1040, that can contain or store programming for use by or in connection with an instruction execution system, apparatus, or device.

Software 1050 can also be propagated within any transport medium for use by or in connection with an instruction execution system, apparatus, or device, such as those described above, that can fetch instructions associated with the software from the instruction execution system, apparatus, or device and execute the instructions. In the context of this disclosure, a transport medium can be any medium that can communicate, propagate or transport programming for use by or in connection with an instruction execution system, apparatus, or device. The transport readable medium can include, but is not limited to, an electronic, magnetic, optical, electromagnetic or infrared wired or wireless propagation medium.

Device 1000 may be connected to a network, which can be any suitable type of interconnected communication system. The network can implement any suitable communications protocol and can be secured by any suitable security protocol. The network can comprise network links of any suitable arrangement that can implement the transmission and reception of network signals, such as wireless network connections, T1 or T3 lines, cable networks, DSL, or telephone lines.

Device 1000 can implement any operating system suitable for operating on the network. Software 1050 can be written in any suitable programming language, such as C, C++, Java or Python. In various embodiments, application software embodying the functionality of the present disclosure can be deployed in different configurations, such as in a client/server arrangement or through a Web browser as a Web-based application or Web service, for example.

Although the disclosure and examples have been fully described with reference to the accompanying figures, it is to be noted that various changes and modifications will become apparent to those skilled in the art. Such changes and modifications are to be understood as being included within the scope of the disclosure and examples as defined by the claims.

The foregoing description, for purpose of explanation, has made reference to specific embodiments. However, the illustrative discussions above are not intended to be exhaustive or to limit the disclosure to the precise forms disclosed. Many modifications and variations are possible in view of the above teachings. The embodiments were chosen and described in order to best explain the principles of the techniques and their practical applications. Others skilled in the art are thereby enabled to best utilize the techniques and various embodiments, with various modifications, that are suited to the particular use contemplated.

Although the disclosure and examples have been fully described with reference to the accompanying figures, it is to be noted that various changes and modifications will become apparent to those skilled in the art. Such changes and modifications are to be understood as being included within the scope of the disclosure and examples as defined by the claims.

What is claimed is:

1. A computer-implemented method, comprising:
    at an electronic device with a display,
        displaying a window associated with a software system;
        displaying a first selectable user control overlaid on the window corresponding to a software adoption platform, wherein the first selectable user control indicates a user-specific score associated with the software system,
        responsive to receiving a selection of the first selectable user control, displaying a user interface corresponding to the software adoption platform overlaid on the window, wherein the user interface corresponding to the software adoption platform comprises:
            the user-specific score associated with the software system,
            a plurality of user affordances corresponding to a plurality of actions within the software system, and
            a plurality of points corresponding to the plurality of actions within the software system;
        upon selection of a user affordance of the plurality of user affordances, automatically displaying a page of the software system in the window based on the selected user affordance, and
        automatically populating a message overlaid over the page of the software system to indicate a second selectable user control of the software system, wherein the one or more messages are generated by the software adoption platform.

2. The method of claim 1, wherein the window is a window of a web browser or a tab of the web browser.

3. The method of claim 1, further comprising:
receiving one or more user inputs corresponding to completion of an action of the plurality of actions; and
updating the user-specific score based on one or more inputs and a role associated with the user.

4. The method of claim 1, wherein the user interface corresponding to the software adoption platform further comprises a ranking of users of the software system.

5. The method of claim 4, wherein the user-specific score is associated with a time period.

6. A computer-implemented method, comprising:
at an electronic device with a display,
displaying a first window associated with a first software system, wherein the first window comprises a first selectable user affordance corresponding to a software adoption platform, wherein the first selectable user affordance indicates a first user-specific score,
upon selection of the first user affordance, displaying a first user interface corresponding to the software adoption platform overlaid on the first window, the first user interface comprising:
the first user-specific score associated with the first software system,
a first plurality of actions associated with the first software system, and
a plurality of points corresponding to the plurality of actions within the first software system;
displaying a second window associated with a second software system, wherein the second window comprises a second selectable user affordance corresponding to the software adoption platform, wherein the second selectable user affordance indicates a second user-specific score,
upon selection of the second user affordance, displaying a second user interface corresponding to the software adoption platform overlaid on the second window, the second user interface comprising:
the second user-specific score associated with the second software system,
a second plurality of actions associated with the second software system, and
a plurality of points corresponding to the plurality of actions within the second software system.

7. The method of claim 6, wherein the window is a window of a web browser or a tab of the web browser.

8. The method of claim 7, wherein the first user affordance is a widget embedded in the web browser.

9. The method of claim 8, wherein the first user affordance comprises the first user-specific score.

10. The method of claim 6, further comprising:
upon selection of an action of the first plurality of actions, automatically displaying a page of the first software system in the first window; and automatically displaying one or more messages overlaid over the page of the first software system, wherein the one or more messages are generated by the software adoption platform.

11. A system comprising:
a display;
one or more processors;
a memory; and
one or more programs, wherein the one or more programs are stored in the memory and configured to be executed by the one or more processors, the one or more programs including instructions for:
displaying a window associated with a software system;
displaying a first selectable user control overlaid on the window corresponding to a software adoption platform, wherein the first selectable user control indicates a user-specific score associated with the software system,
responsive to receiving a selection of the first selectable user control, displaying a user interface corresponding to the software adoption platform overlaid on the window, wherein the user interface corresponding to the software adoption platform comprises:
the user-specific score associated with the software system,
a plurality of user affordances corresponding to a plurality of actions within the software system, and
a plurality of points corresponding to the plurality of actions within the software system;
upon selection of a user affordance of the plurality of user affordances, automatically displaying a page of the software system in the window based on the selected user affordance, and
automatically populating a message overlaid over the page of the software system to indicate a second selectable user control of the software system, wherein the one or more messages are generated by the software adoption platform.

12. The system of claim 11, wherein the window is a window of a web browser or a tab of the web browser.

13. The system of claim 11, wherein the one or more programs further include instructions for:
receiving one or more user inputs corresponding to completion of an action of the plurality of actions; and
updating the user-specific score based on one or more inputs and a role associated with the user.

14. The system of claim 11, wherein the user interface corresponding to the software adoption platform further comprises a ranking of users of the software system.

15. The system of claim 14, wherein the user-specific score is associated with a time period.

* * * * *